United States Patent
Xin et al.

(10) Patent No.: US 7,710,462 B2
(45) Date of Patent: *May 4, 2010

(54) METHOD FOR RANDOMLY ACCESSING MULTIVIEW VIDEOS

(75) Inventors: Jun Xin, Quincy, MA (US); Emin Martinian, Waltham, MA (US); Alexander Behrens, Bueckeburg (DE); Anthony Vetro, Arlington, MA (US); Huifang Sun, Billerica, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 679 days.

This patent is subject to a terminal disclaimer.

(21) Appl. No.: 11/292,168

(22) Filed: Nov. 30, 2005

(65) Prior Publication Data
US 2006/0146141 A1    Jul. 6, 2006

Related U.S. Application Data

(63) Continuation-in-part of application No. 11/015,390, filed on Dec. 17, 2004, now Pat. No. 7,468,745.

(51) Int. Cl.
*H04N 5/225* (2006.01)
(52) U.S. Cl. .................................. 348/218.1
(58) Field of Classification Search ............ 348/207.99, 348/218.1; 375/240.01–240.29
See application file for complete search history.

(56) References Cited

U.S. PATENT DOCUMENTS

| | | | | |
|---|---|---|---|---|
| 6,055,012 A | * | 4/2000 | Haskell et al. | 348/48 |
| 6,055,274 A | * | 4/2000 | McVeigh | 375/240.16 |
| 2003/0202592 A1 | | 10/2003 | Sohn et al. | |
| 2005/0008240 A1 | | 1/2005 | Bannerji | |
| 2006/0206582 A1 | * | 9/2006 | Finn | 709/217 |

OTHER PUBLICATIONS

Emin Martinian, "MERL Response to Call for Evidence on Multi-view Video Coding," International Organisation for Standardisation Organisation Internationale De Normalisation ISO/IEC JTC1/SC29/WG11 Coding of Moving Pictures and Audio, Jan. 2005, XP030040445.
Guoping et al."A novel multi-view video coding scheme based on H.264," Dec. 15, 2003.
Zitnick et al. "High-quality video view interpolation using a layered representation," Aug. 8, 2004.
Kimata et al. "System design of free viewpoint video communication," Sep. 14, 2004.

* cited by examiner

*Primary Examiner*—David L Ometz
*Assistant Examiner*—Akshay Trehan
(74) *Attorney, Agent, or Firm*—Dirk Brinkman; Gene Vinokur

(57) ABSTRACT

A method randomly accesses multiview videos. Multiview videos are acquired of a scene with corresponding cameras arranged at poses, such that there is view overlap between any pair of cameras. V-frames are generated from the multiview videos. The V-frames are encoded using only spatial prediction. Then, the V-frames are inserted periodically in an encoded bitstream to provide random temporal access to the multiview videos.

10 Claims, 19 Drawing Sheets

METHOD FOR RANDOMLY ACCESSING MULTIVIEW VIDEOS

RELATED APPLICATIONS

This application is a continuation-in-part of U.S. patent application Ser. No. 11/015,390 entitled "Multiview Video Decomposition and Encoding" and filed by Xin et al. on Dec. 17, 2004 now U.S. Pat. No. 7,468,745. This application is related to U.S. patent application Ser. No. 11/292,393 entitled "Method and System for Managing Reference Pictures in Multiview Videos" and U.S. patent application Ser. No. 11/292,168 entitled, "Method for Randomly Accessing Multiview Videos", both of which were co-filed with this application by Xin et al. on Nov. 30, 2005.

FIELD OF THE INVENTION

This invention relates generally to encoding and decoding multiview videos, and more particularly to randomly accessing multiview videos.

BACKGROUND OF THE INVENTION

Multiview video encoding and decoding is essential for applications such as three dimensional television (3DTV), free viewpoint television (FTV), and multi-camera surveillance. Multiview video encoding and decoding is also known as dynamic light field compression.

FIG. 1 shows a prior art 'simulcast' system 100 for multiview video encoding. Cameras 1-4 acquire sequences of frames or videos 101-104 of a scene 5. Each camera has a different view of the scene. Each video is encoded 111-114 independently to corresponding encoded videos 121-124. That system uses conventional 2D video encoding techniques. Therefore, that system does not correlate between the different videos acquired by the cameras from the different viewpoints while predicting frames of the encoded video. Independent encoding decreases compression efficiency, and thus network bandwidth and storage are increased.

FIG. 2 shows a prior art disparity compensated prediction system 200 that does use inter-view correlations. Videos 201-204 are encoded 211-214 to encoded videos 231-234. The videos 201 and 204 are encoded independently using a standard video encoder such as MPEG-2 or H.264, also known as MPEG-4 Part 10. These independently encoded videos are 'reference' videos. The remaining videos 202 and 203 are encoded using temporal prediction and inter-view predictions based on reconstructed reference videos 251 and 252 obtained from decoders 221 and 222. Typically, the prediction is determined adaptively on a per block basis, S. C. Chan et al., "The data compression of simplified dynamic light fields," Proc. IEEE Int. Acoustics, Speech, and Signal Processing Conf., April, 2003.

FIG. 3 shows prior art 'lifting-based' wavelet decomposition, see W. Sweldens, "The data compression of simplified dynamic light fields," J. Appl. Comp. Harm. Anal., vol. 3, no. 2, pp. 186-200, 1996. Wavelet decomposition is an effective technique for static light field compression. Input samples 301 are split 310 into odd samples 302 and even samples 303. The odd samples are predicted 320 from the even samples. A prediction error forms high band samples 304. The high band samples are used to update 330 the even samples and to form low band samples 305. That decomposition is invertible so that linear or non-linear operations can be incorporated into the prediction and update steps.

The lifting scheme enables a motion-compensated temporal transform, i.e., motion compensated temporal filtering (MCTF) which, for videos, essentially filters along a temporal motion trajectory. A review of MCTF for video coding is described by Ohm et al., "Interframe wavelet coding-motion picture representation for universal scalability," Signal Processing: Image Communication, vol. 19, no. 9, pp. 877-908, October 2004. The lifting scheme can be based on any wavelet kernel such as Harr or 5/3 Daubechies, and any motion model such as block-based translation or affine global motion, without affecting the reconstruction.

For encoding, the MCTF decomposes the video into high band frames and low band frames. Then, the frames are subjected to spatial transforms to reduce any remaining spatial correlations. The transformed low and high band frames, along with associated motion information, are entropy encoded to form an encoded bitstream. MCTF can be implemented using the lifting scheme shown in FIG. 3 with the temporally adjacent videos as input. In addition, MCTF can be applied recursively to the output low band frames.

MCTF-based videos have a compression efficiency comparable to that of video compression standards such as H.264/AVC. In addition, the videos have inherent temporal scalability. However, that method cannot be used for directly encoding multiview videos in which there is a correlation between videos acquired from multiple views because there is no efficient method for predicting views that accounts for correlation in time.

The lifting scheme has also been used to encode static light fields, i.e., single multiview images. Rather than performing a motion-compensated temporal filtering, the encoder performs a disparity compensated inter-view filtering (DCVF) across the static views in the spatial domain, see Chang et al., "Inter-view wavelet compression of light fields with disparity compensated lifting," SPIE Conf on Visual Communications and Image Processing, 2003. For encoding, DCVF decomposes the static light field into high and low band images, which are then subject to spatial transforms to reduce any remaining spatial correlations. The transformed images, along with the associated disparity information, are entropy encoded to form the encoded bitstream. DCVF is typically implemented using the lifting-based wavelet transform scheme as shown in FIG. 3 with the images acquired from spatially adjacent camera views as input. In addition, DCVF can be applied recursively to the output low band images. DCVF-based static light field compression provides a better compression efficiency than independently coding the multiple frames. However, that method also cannot encode multiview videos in which both temporal correlation and spatial correlation between views are used because there is no efficient method for predicting views that account for correlation in time.

SUMMARY OF THE INVENTION

A method and system to decompose multiview videos acquired of a scene by multiple cameras is presented.

Each multiview video includes a sequence of frames, and each camera provides a different view of the scene.

A prediction mode is selected from a temporal, spatial, view synthesis, and intra-prediction mode.

The multiview videos are then decomposed into low band frames, high band frames, and side information according to the selected prediction mode.

A novel video reflecting a synthetic view of the scene can also be generated from one or more of the multiview videos.

More particularly, one embodiment of the invention provides a method for randomly accessing multiview videos. Multiview videos are acquired of a scene with corresponding cameras arranged at poses, such that there is view overlap between any pair of cameras. V-frames are generated from the multiview videos. The V-frames are encoded using only spatial prediction. Then, the V-frames are inserted periodically in an encoded bitstream to provide random temporal access to the multiview videos.

DETAILED DESCRIPTION OF THE EMBODIMENTS OF THE INVENTION

One embodiment of our invention provides a joint temporal/inter-view processing method for encoding and decoding frames of multiview videos. Multiview videos are videos that are acquired of a scene by multiple cameras having different poses. We define a pose camera as both its 3D (x, y, z) position, and its 3D ($\theta$, $\rho$, $\phi$) orientation. Each pose corresponds to a 'view' of the scene.

The method uses temporal correlation between frames within each video acquired for a particular camera pose, as well as spatial correlation between synchronized frames in videos acquired from multiple camera views. In addition, 'synthetic' frames can be correlated, as described below.

In one embodiment, the temporal correlation uses motion compensated temporal filtering (MCTF), while the spatial correlation uses disparity compensated inter-view filtering (DCVF).

In another embodiment of the invention, spatial correlation uses prediction of one view from synthesized frames that are generated from 'neighboring' frames. Neighboring frames are temporally or spatially adjacent frames, for example, frames before or after a current frame in the temporal domain, or one or more frames acquired at the same instant in time but from cameras having different poses or views of the scene.

Each frame of each video includes macroblocks of pixels. Therefore, the method of multiview video encoding and decoding according to one embodiment of the invention is macroblock adaptive. The encoding and decoding of a current macroblock in a current frame is performed using several possible prediction modes, including various forms of temporal, spatial, view synthesis, and intra prediction. To determine the best prediction mode on a macroblock basis, one embodiment of the invention provides a method for selecting a prediction mode. The method can be used for any number of camera arrangements.

In order to maintain compatibility with existing single-view encoding and decoding systems, a method for managing a reference picture list is described. Specifically, we describe a method of inserting and removing reference pictures from a picture buffer according to the reference picture list. The reference pictures include temporal reference pictures, spatial reference pictures and synthesized reference pictures.

As used herein, a reference picture is defined as any frame that is used during the encoding and decoding to 'predict' a current frame. Typically, reference pictures are spatially or temporally adjacent or 'neighboring' to the current frame.

It is important to note that the same operations are applied in both the encoder and decoder because the same set of reference pictures are used at any give time instant to encode and decode the current frame.

One embodiment of the invention enables random access to the frames of the multiview videos during encoding and decoding. This improves coding efficiency.

MCTF/DCVF Decomposition

Figure 1:
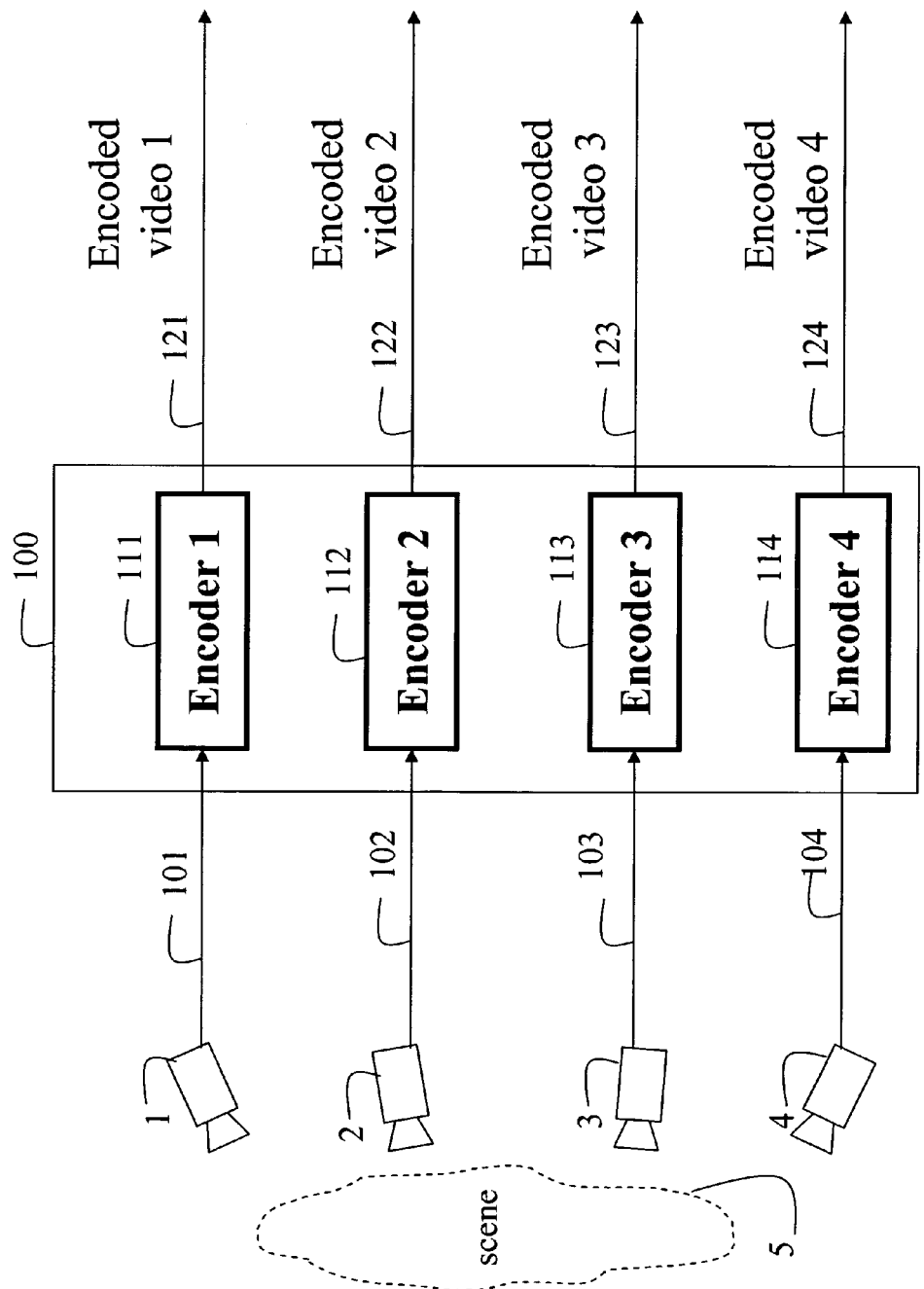
FIG. 1 is a block diagram of a prior art system for encoding multiview videos.
Figure 2:
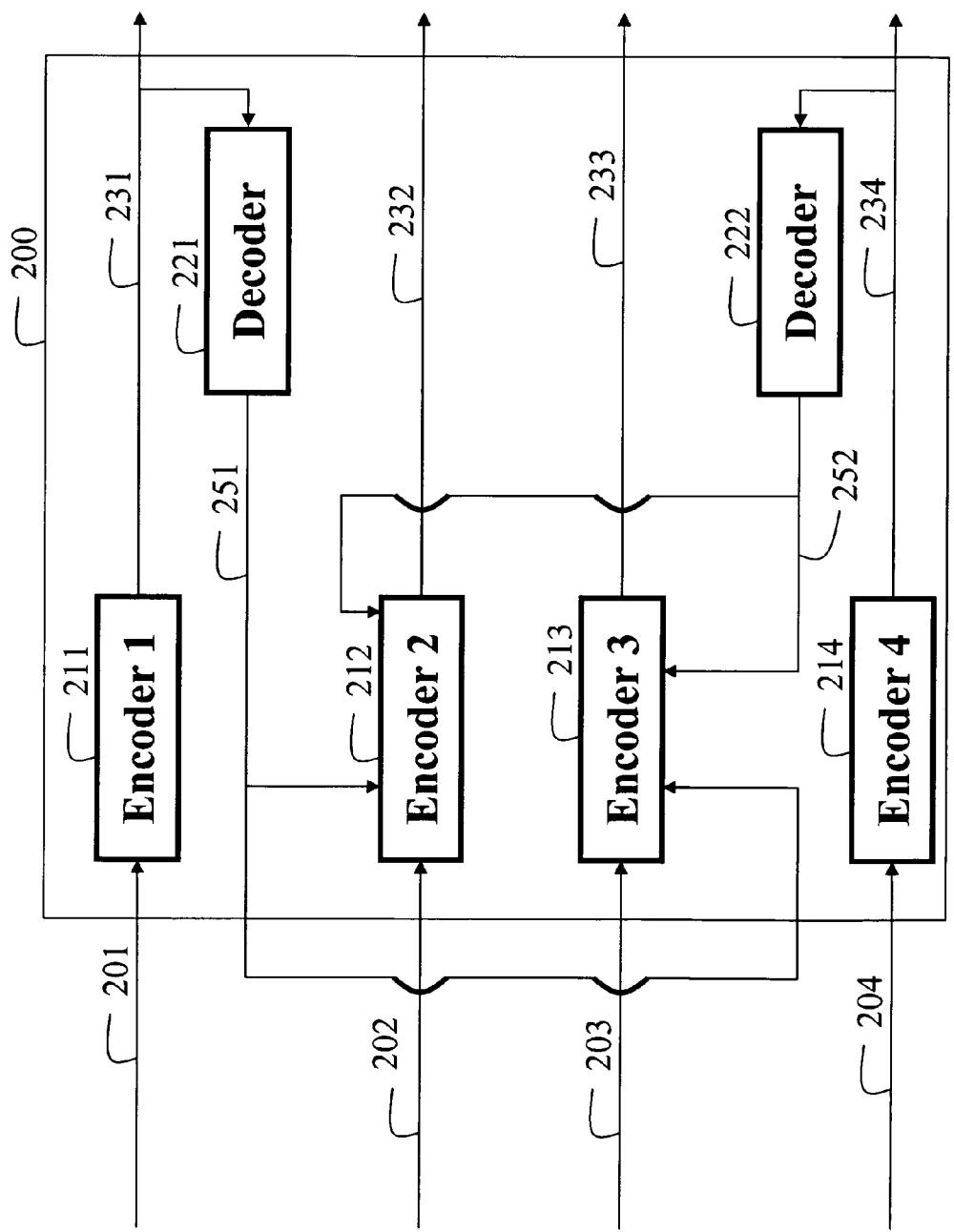
FIG. 2 is a block diagram of a prior art disparity compensated prediction system for encoding multiview videos.
Figure 3:
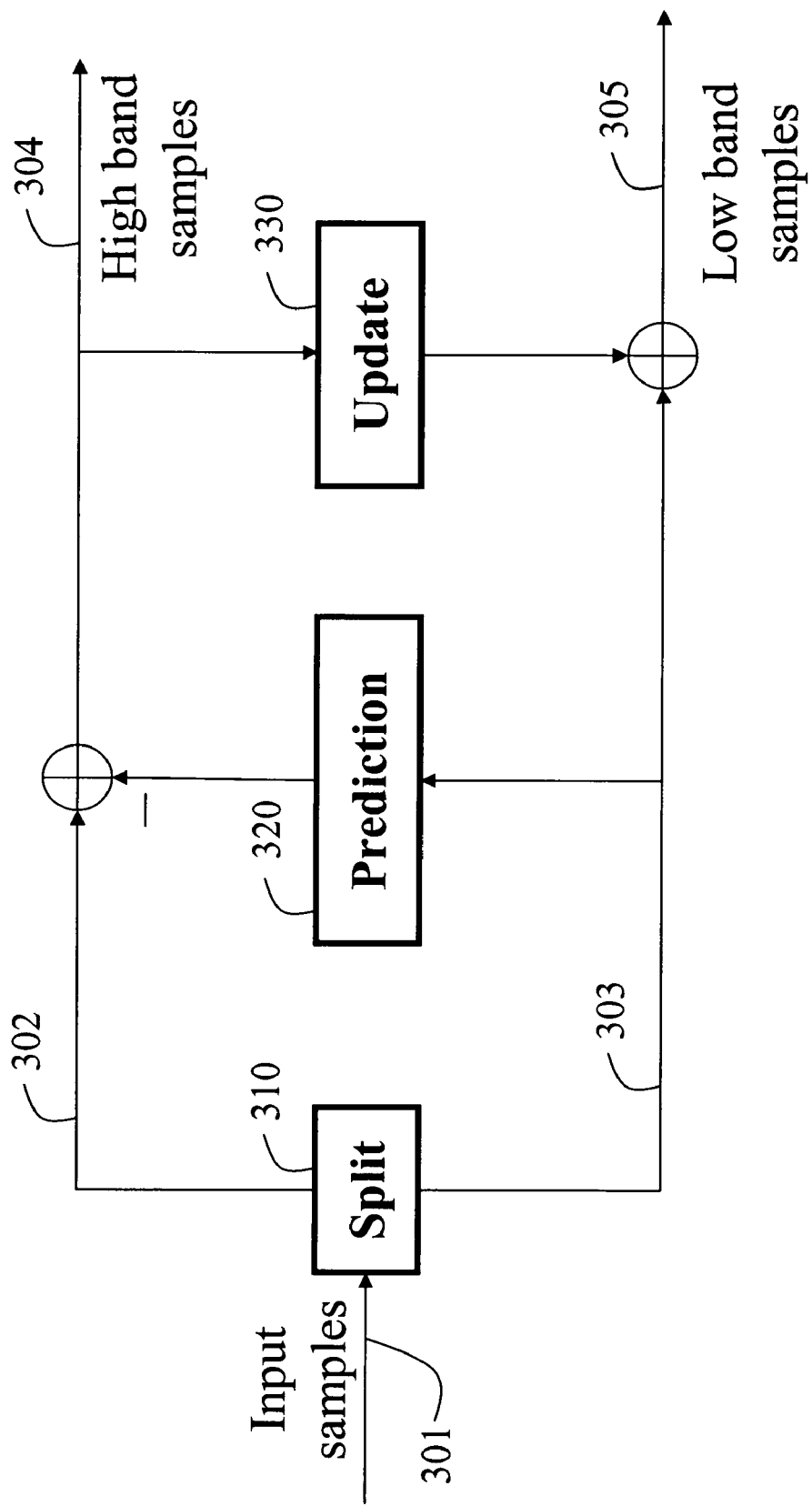
FIG. 3 is a flow diagram of a prior art wavelet decomposition process.
Figure 4:
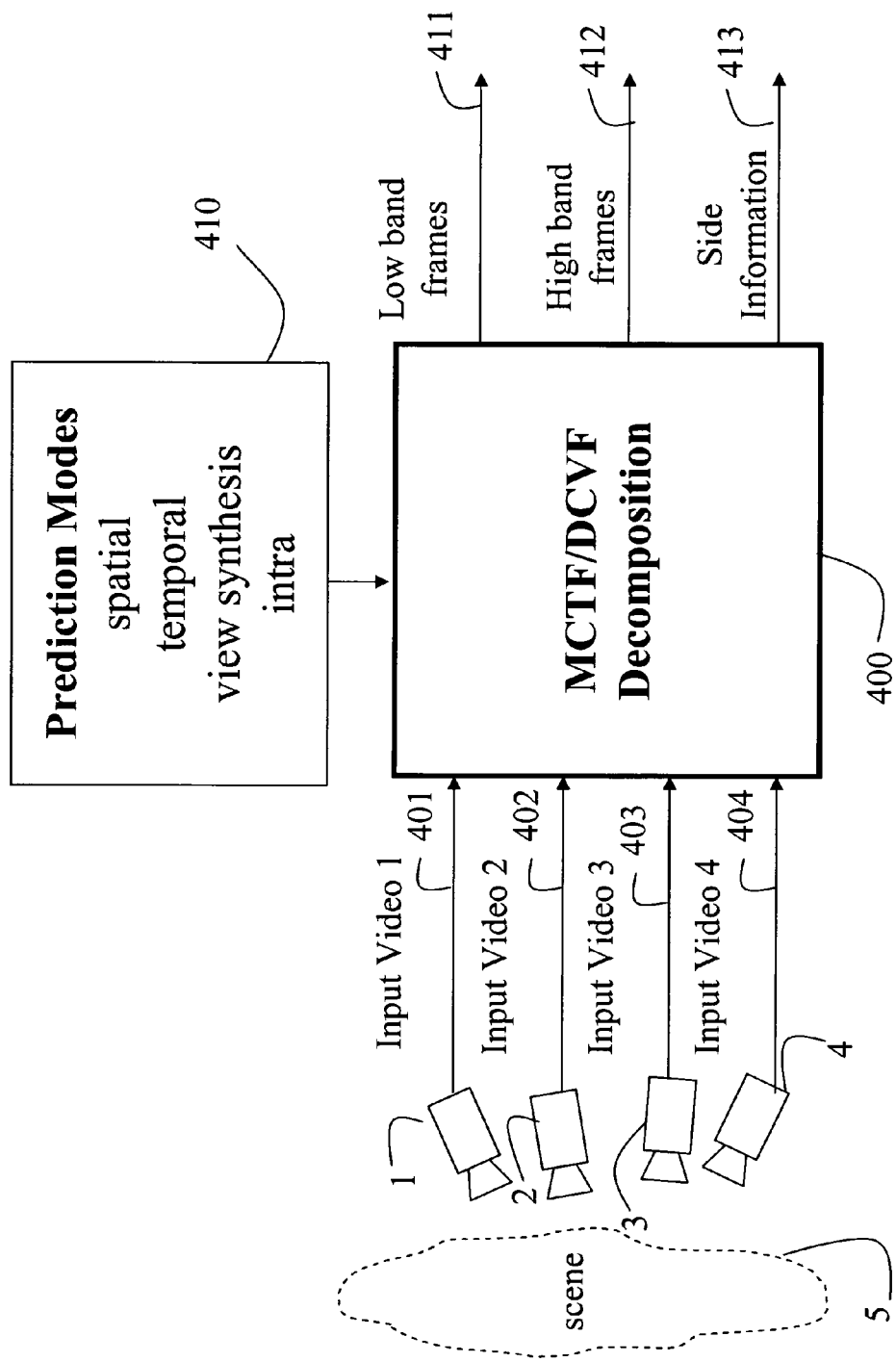
FIG. 4 is a block diagram of a MCTF/DCVF decomposition according to an embodiment of the invention.
Figure 8:
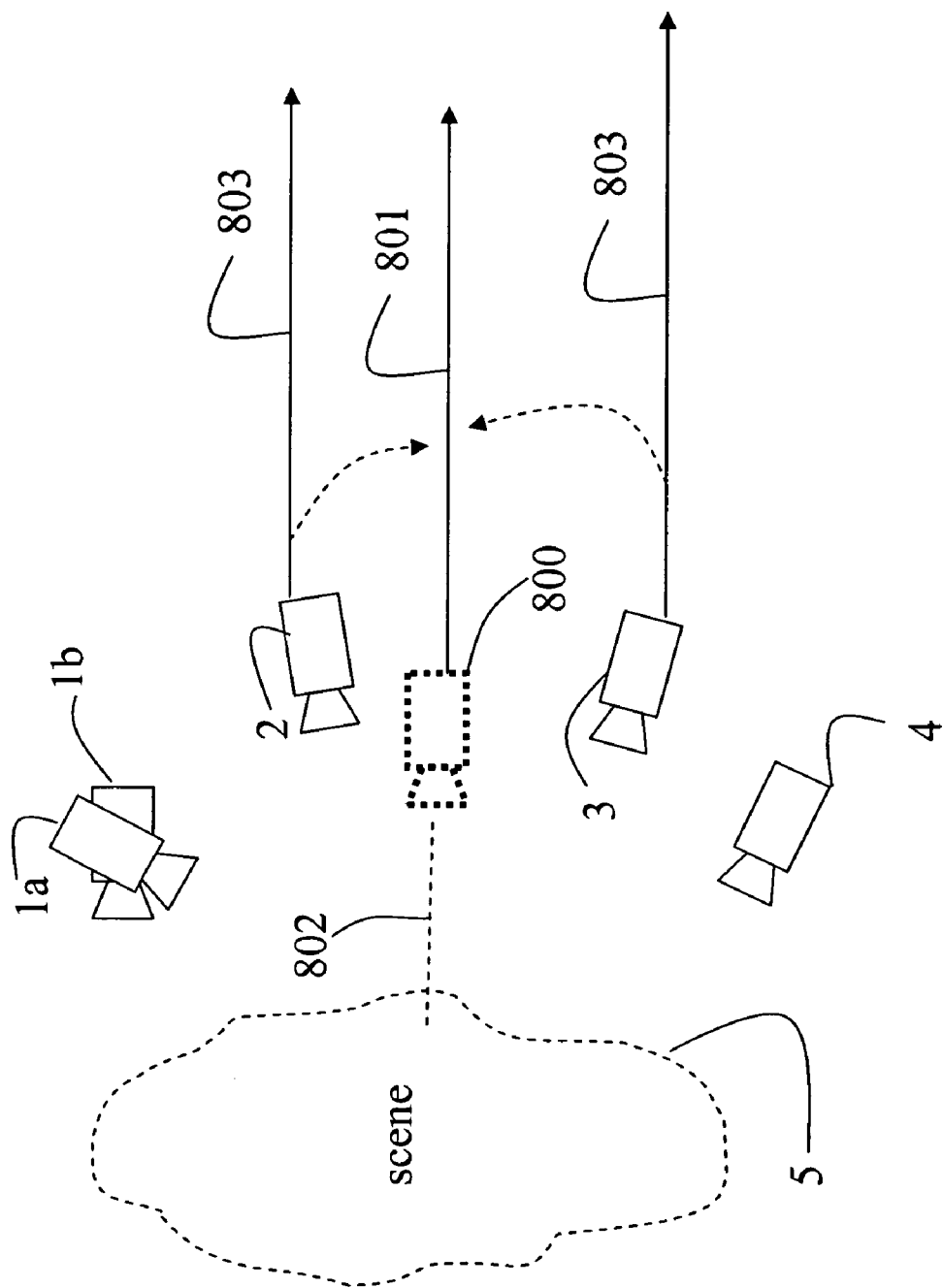
FIG. 8 is a schematic of video synthesis according to an embodiment of the invention.

FIG. 4 show a MCTF/DCVF decomposition 400 according to one embodiment of the invention. Frames of input videos 401-404 are acquired of a scene 5 by cameras 1-4 having different posses. Note, as shown in FIG. 8, some of the cameras 1a and 1b can be at the same locations but with different orientations. It is assumed that there is some amount of view overlap between any pair of cameras. The poses of the cameras can change while acquiring the multiview videos. Typically, the cameras are synchronized with each other. Each input video provides a different 'view' of the scene. The input frames 401-404 are sent to a MCTF/DCVF decomposition 400. The decomposition produces encoded low-band frames 411, encoded high band frames 412, and associated side information 413. The high band frames encode prediction errors using the low band frames as reference pictures. The decomposition is according to selected prediction modes 410. The prediction modes include spatial, temporal, view synthesis, and intra prediction modes. The prediction modes can be selected adaptively on a per macroblock basis for each current frame. With intra prediction, the current macroblock is predicted from other macroblocks in the same frame.

Figure 5:
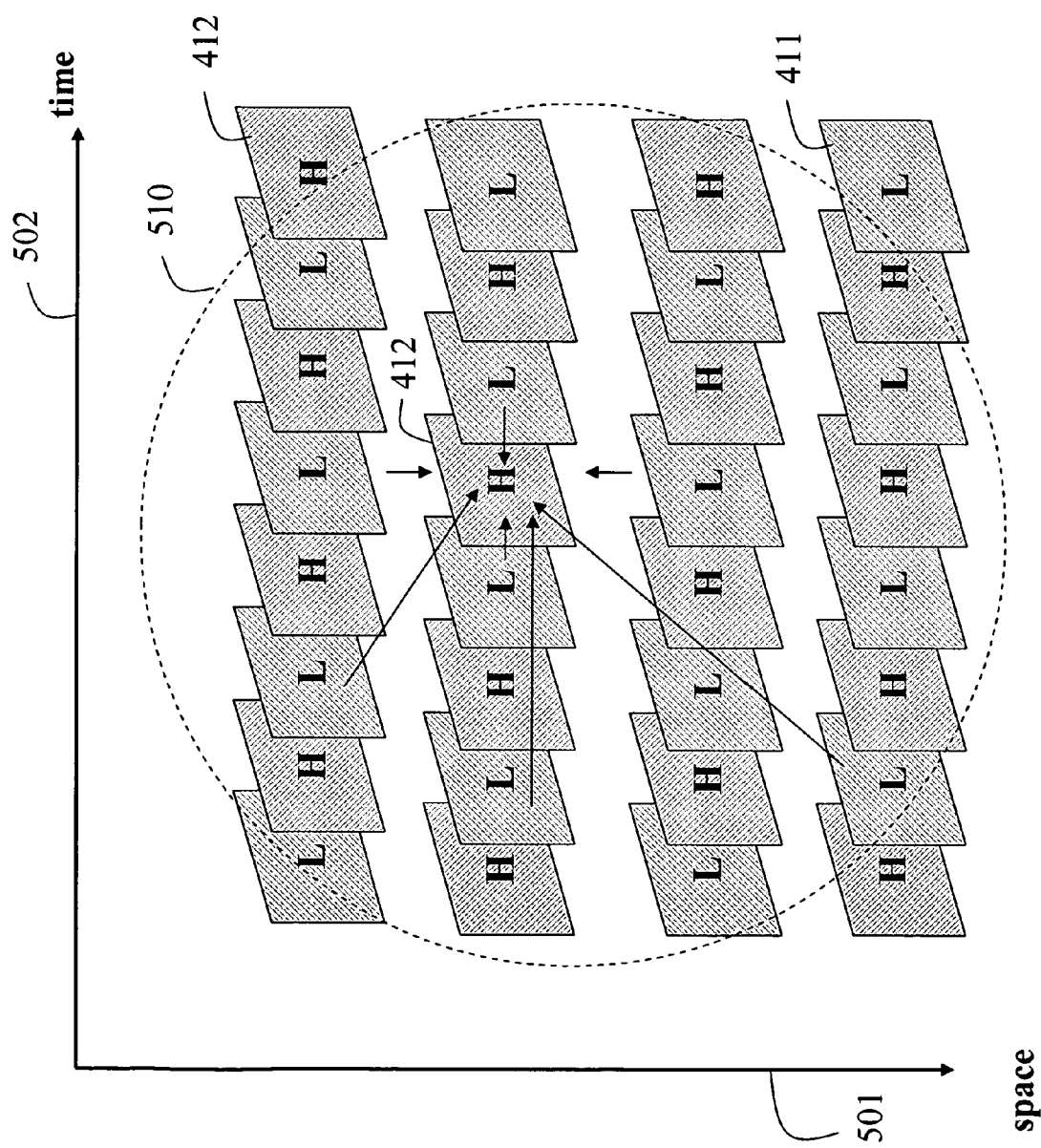
FIG. 5 is a block diagram of low-band frames and high band frames as a function of time and space after the MCTF/DCVF decomposition according to an embodiment of the invention.

FIG. 5 shows a preferred alternating 'checkerboard pattern' of the low band frames (L) 411 and the high band frames (H) 412 for a neighborhood of frames 510. The frames have a spatial (view) dimension 501 and a temporal dimension 502. Essentially, the pattern alternates low band frames and high band frames in the spatial dimension for a single instant in time, and additionally alternates temporally the low band frames and the high band frames for a single video.

There are several advantages of this checkerboard pattern. The pattern distributes low band frames evenly in both the space and time dimensions, which achieves scalability in space and time when a decoder only reconstructs the low band frames. In addition, the pattern aligns the high band frames with adjacent low band frames in both the space and time dimensions. This maximizes the correlation between reference pictures from which the predictions of the errors in the current frame are made, as shown in FIG. 6.

According to a lifting-based wavelet transform, the high band frames 412 are generated by predicting one set of samples from the other set of samples. The prediction can be achieved using a number of modes including various forms of temporal prediction, various forms of spatial prediction, and a view synthesis prediction according to the embodiments of invention described below.

The means by which the high band frames 412 are predicted and the necessary information required to make the prediction are referred to as the side information 413. If a temporal prediction is performed, then the temporal mode is signaled as part of the side information along with corresponding motion information. If a spatial prediction is performed, then the spatial mode is signaled as part of the side information along with corresponding disparity information. If view synthesis prediction is performed, then the view synthesis mode is signaled as part of the side information along with corresponding disparity, motion and depth information.

Figure 6:
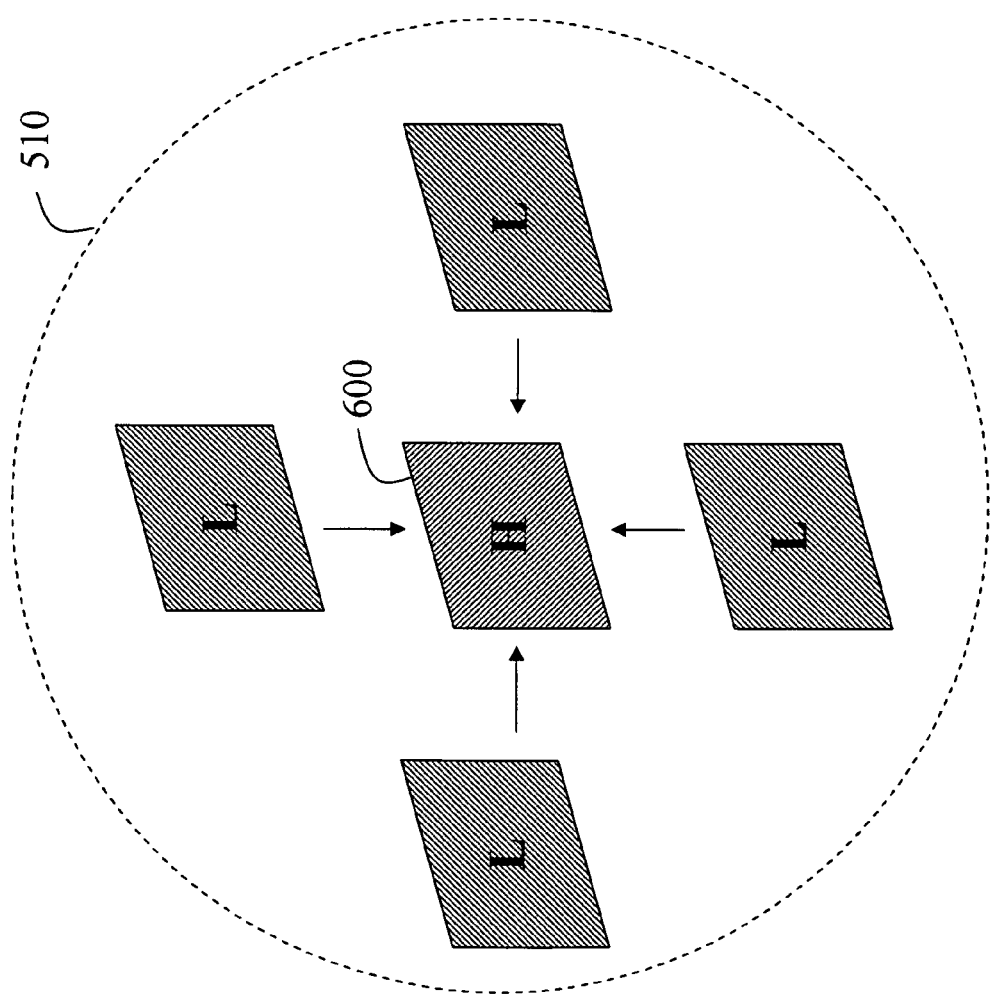
FIG. 6 is a block diagram of prediction of high band frame from adjacent low-band frames according to an embodiment of the invention.

As shown in FIGS. 6, the prediction of each current frame 600 uses neighboring frames 510 in both the space and time dimensions. The frames that are used for predicting the current frame are called reference pictures. The reference pictures are maintained in the reference list, which is part of the encoded bitstream. The reference pictures are stored in the decoded picture buffer.

In one embodiment of the invention, the MCTF and DCVF are applied adaptively to each current macroblock for each frame of the input videos to yield decomposed low band frames, as well as the high band frames and the associated side information. In this way, each macroblock is processed adaptively according to a 'best' prediction mode. An optimal method for selecting the prediction mode is described below.

In one embodiment of the invention, the MCTF is first applied to the frames of each video independently. The resulting frames are then further decomposed with the DCVF. In addition to the final decomposed frames, the corresponding side information is also generated. If performed on a macroblock-basis, then the prediction mode selections for the MCTF and the DCVF are considered separately. As an advantage, this prediction mode selection inherently supports temporal scalability. In this way, lower temporal rates of the videos are easily accessed in the compressed bitstream.

In another embodiment, the DCVF is first applied to the frames of the input videos. The resulting frames are then temporally decomposed with the MCTF. In addition to the final decomposed frames, the side information is also generated. If performed on a macroblock-basis, then the prediction mode selections for the MCTF and DCVF are considered separately. As an advantage, this selection inherently supports spatial scalability. In this way, a reduced number of the views are easily accessed in the compressed bitstream.

The decomposition described above can be applied recursively on the resulting set of low band frames from a previous decomposition stage. As an advantage, our MCTF/DCVF decomposition 400 effectively removes both temporal and spatial (inter-view) correlations, and can achieve a very high compression efficiency. The compression efficiency of our multiview video encoder outperforms conventional simulcast encoding, which encodes each video for each view independently.

Coding of MCTF/DCVF Decomposition

Figure 7:
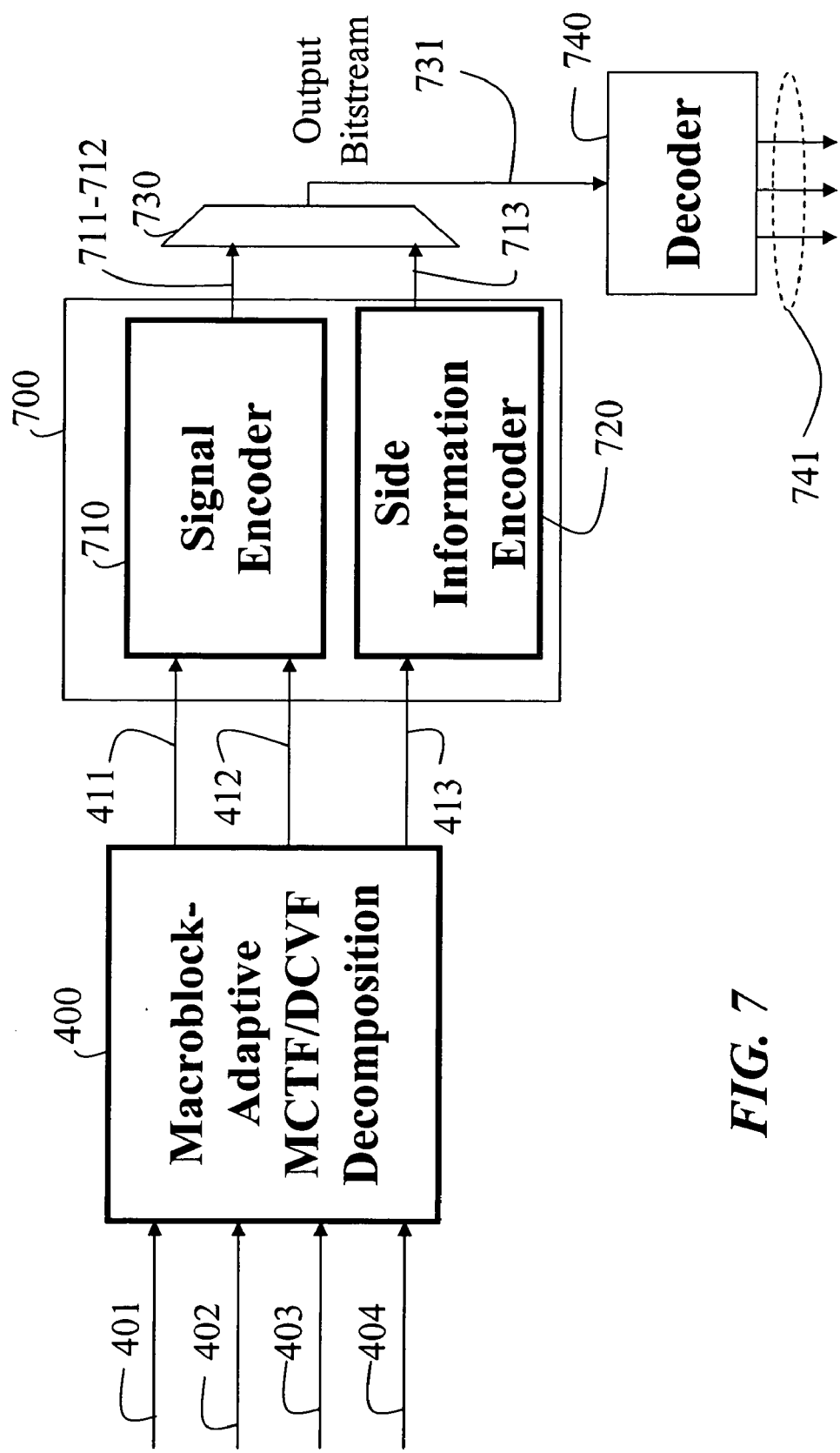
FIG. 7 is a block diagram of a multiview coding system using macroblock-adaptive MCTF/DCVF decomposition according to an embodiment of the invention.

As shown in FIG. 7, the outputs 411 and 412 of decomposition 400 are fed to a signal encoder 710, and the output 413 is fed to a side information encoder 720. The signal encoder 710 performs a transform, quantization and entropy coding to remove any remaining correlations in the decomposed low band and high band frames 411-412. Such operations are well known in the art, Netravali and Haskell, Digital Pictures: Representation, Compression and Standards, Second Edition, Plenum Press, 1995.

The side information encoder 720 encodes the side information 413 generated by the decomposition 400. In addition to the prediction mode and the reference picture list, the side information 413 includes motion information corresponding to the temporal predictions, disparity information corresponding to the spatial predictions and view synthesis and depth information corresponding to the view synthesis predictions.

Encoding the side information can be achieved by known and established techniques, such as the techniques used in the MPEG-4 Visual standard, ISO/IEC 14496-2, "Information technology—Coding of audio-visual objects—Part 2: Visual," $2^{nd}$ Edition, 2001, or the more recent H.264/AVC standard, and ITU-T Recommendation H.264, "Advanced video coding for generic audiovisual services," 2004.

For instance, motion vectors of the macroblocks are typically encoded using predictive methods that determine a prediction vector from vectors in macroblocks in reference pictures. The difference between the prediction vector and the current vector is then subject to an entropy coding process, which typically uses the statistics of the prediction error. A similar procedure can be used to encode disparity vectors.

Furthermore, depth information for each macroblock can be encoded using predictive coding methods in which a prediction from macroblocks in reference pictures is obtained, or by simply using a fixed length code to express the depth value directly. If pixel level accuracy for the depth is extracted and compressed, then texture coding techniques that apply transform, quantization and entropy coding techniques can be applied.

The encoded signals 711-713 from the signal encoder 710 and side information encoder 720 can be multiplexed 730 to produce an encoded output bitstream 731.

Decoding of MCTF/DCVF Decomposition

The bitstream 731 can be decoded 740 to produce output multiview videos 741 corresponding to the input multiview videos 401-404. Optionally, synthetic video can also be generated. Generally, the decoder performs the inverse operations of the encoder to reconstruct the multiview videos. If all low band and high band frames are decoded, then the full set of frames in both the space (view) dimension and time dimension at the encoded quality are reconstructed and available.

Depending on the number of recursive levels of decomposition that were applied in the encoder and which type of decompositions were applied, a reduced number of videos and/or a reduced temporal rate can be decoded as shown in FIG. 7.

View Synthesis

As shown in FIG. 8, view synthesis is a process by which frames 801 of a synthesized video are generated from frames 803 of one or more actual multiview videos. In other words, view synthesis provides a means to synthesize the frames 801 corresponding to a selected novel view 802 of the scene 5. This novel view 802 may correspond to a 'virtual' camera 800 not present at the time the input multiview videos 401-404 were acquired or the view can correspond to a camera view that is acquired, whereby the synthesized view will be used for prediction and encoding/decoding of this view as described below.

If one video is used, then the synthesis is based on extrapolation or warping, and if multiple videos are used, then the synthesis is based on interpolation.

Given the pixel values of frames 803 of one or more multiview videos and the depth values of points in the scene, the pixels in the frames 801 for the synthetic view 802 can be synthesized from the corresponding pixel values in the frames 803.

View synthesis is commonly used in computer graphics for rendering still images for multiple views, see Buehler et al., "Unstructured Lumigraph Rendering," Proc. ACM SIGGRAPH, 2001. That method requires extrinsic and intrinsic parameters for the cameras.

View synthesis for compressing multiview videos is novel. In one embodiment of our invention, we generate synthesized frames to be used for predicting the current frame. In one embodiment of the invention, synthesized frames are generated for designated high band frames. In another embodiment of the invention, synthesized frames are generated for specific views. The synthesized frames serve as reference pictures from which a current synthesized frame can be predicted.

One difficulty with this approach is that the depth values of the scene 5 are unknown. Therefore, we estimate the depth values using known techniques, e.g., based on correspondences of features in the multiview videos.

Alternatively, for each synthesized video, we generate multiple synthesized frames, each corresponding to a candidate depth value. For each macroblock in the current frame, the best matching macroblock in the set of synthesized frames is determined. The synthesized frame from which this best match is found indicates the depth value of the macroblock in the current frame. This process is repeated for each macroblock in the current frame.

A difference between the current macroblock and the synthesized block is encoded and compressed by the signal encoder 710. The side information for this multiview mode is encoded by the side information encoder 720. The side information includes a signal indicating the view synthesis prediction mode, the depth value of the macroblock, and an optional displacement vector that compensates for any misalignments between the macroblock in the current frame and the best matching macroblock in the synthesized frame to be compensated.

Prediction Mode Selection

In the macroblock-adaptive MCTF/DCVF decomposition, the prediction mode m for each macroblock can be selected by minimizing a cost function adaptively on a per macroblock basis:

$$m^* = \arg\min_{m} J(m),$$

where $J(m)=D(m)+\lambda R(m)$, and D is distortion, $\lambda$ is a weighting parameter, R is rate, m indicates the set of candidate prediction modes, and $m^*$ indicates the optimal prediction mode that has been selected based on a minimum cost criteria.

The candidate modes m include various modes of temporal, spatial, view synthesis, and intra prediction. The cost function J(m) depends on the rate and distortion resulting from encoding the macroblock using a specific prediction mode m.

The distortion D measures a difference between a reconstructed macroblock and a source macroblock. The reconstructed macroblock is obtained by encoding and decoding the macroblock using the given prediction mode m. A common distortion measure is a sum of squared difference. The rate R corresponds to the number of bits needed to encode the macroblock, including the prediction error and the side information. The weighting parameter $\lambda$ controls the rate-distortion tradeoff of the macroblock coding, and can be derived from a size of a quantization step.

Detailed aspects of the encoding and decoding processes are described in further detail below. In particular, the various data structures that are used by the encoding and decoding processes are described. It should be understood that the data structures, as described herein, that are used in the encoder are identical to corresponding data structures used in the decoder. It should also be understood that the processing steps of the decoder essentially follow the same processing steps as the encoder, but in an inverse order.

Reference Picture Management

Figure 9:
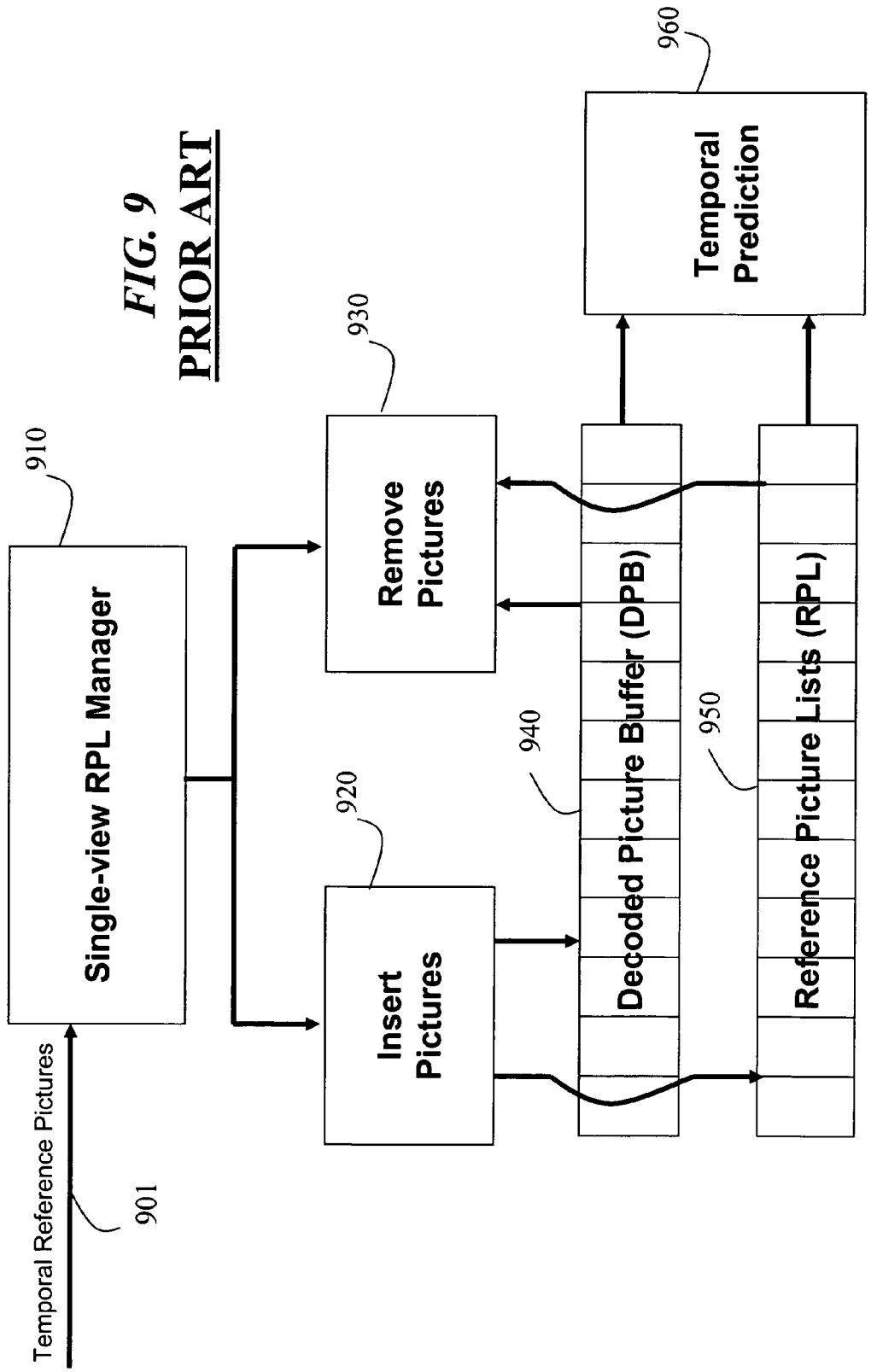
FIG. 9 is a block diagram of a prior art reference picture management.

FIG. 9 shows a reference picture management for prior art single-view encoding and decoding systems. Temporal reference pictures 901 are managed by a single-view reference picture list (RPL) manager 910, which determines insertion 920 and removal 930 of temporal reference pictures 901 to a decoded picture buffer (DPB) 940. A reference picture list 950 is also maintained to indicate the frames that are stored in the DPB 940. The RPL is used for reference picture management operations such as insert 920 and remove 930, as well as temporal prediction 960 in both the encoded and the decoder.

In single-view encoders, the temporal reference pictures 901 are generated as a result of applying a set of typical encoding operations including prediction, transform and quantization, then applying the inverse of those operations including inverse quantization, inverse transform and motion compensation. Furthermore, temporal reference pictures 901 are only inserted into the DPB 940 and added to the RPL 950 when the temporal pictures are required for the prediction of a current frame in the encoder.

In single-view decoders, the same temporal reference pictures 901 are generated by applying a set of typical decoding operations on the bitstream including inverse quantization, inverse transform and motion compensation. As in the encoder, the temporal reference pictures 901 are only inserted 920 into the DPB 940 and added to the RPL 950 if they are required for prediction of a current frame in the decoder.

Figure 10:
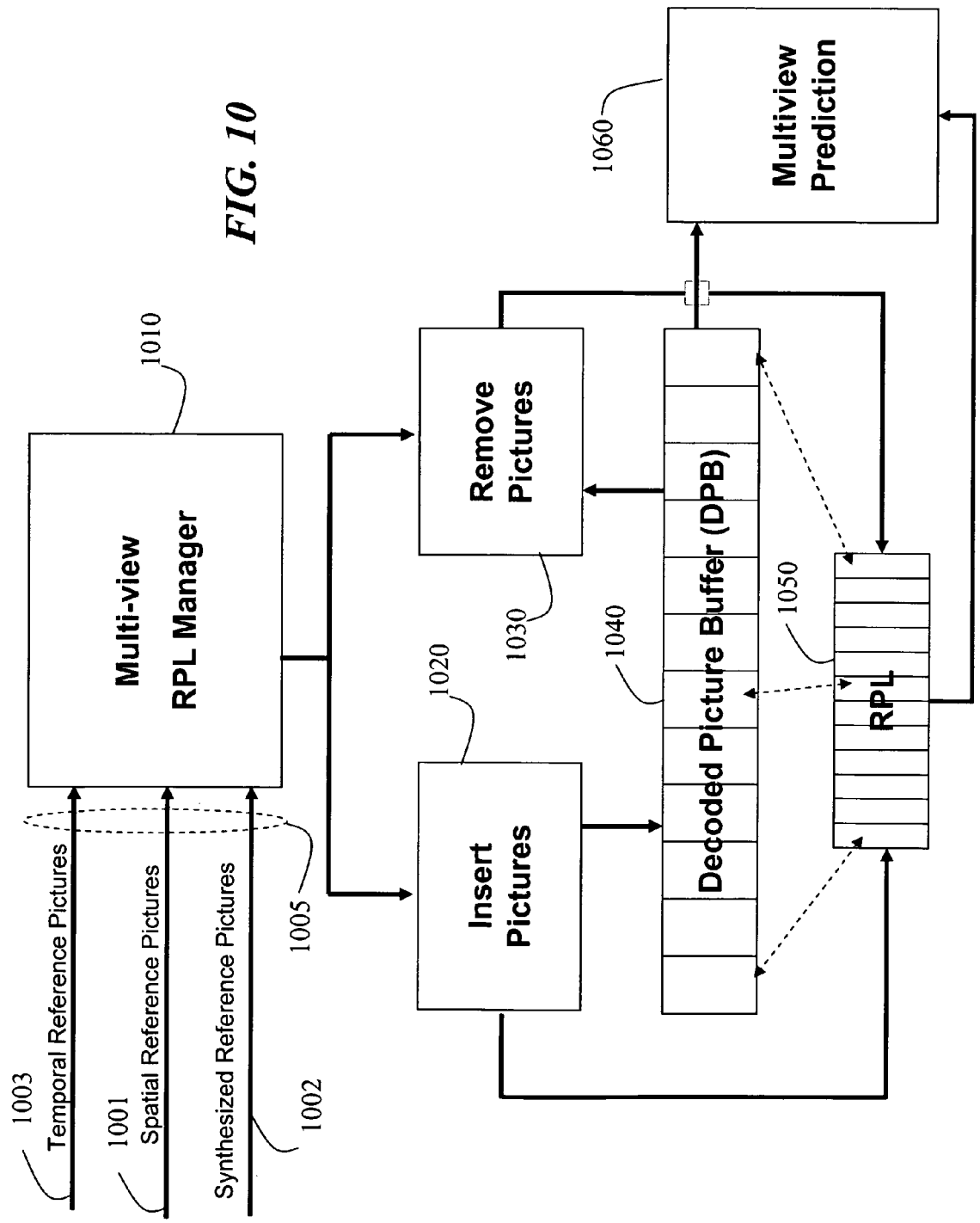
FIG. 10 is a block diagram of multiview reference picture management according to an embodiment of the invention.

FIG. 10 shows a reference picture management for multi-view encoding and decoding. In addition to temporal reference pictures 1003, the multiview systems also include spatial reference pictures 1001 and synthesized reference pictures 1002. These reference pictures are collectively referred to as multiview reference pictures 1005. The multiview reference pictures 1005 are managed by a multiview RPL manager 1010, which determines insertion 1020 and removal 1030 of the multiview reference pictures 1005 to the multiview DPB 1040. For each video, a multiview reference picture list (RPL) 1050 is also maintained to indicate the frames that are stored in the DPB. That is, the RPL is an index for the DPB. The multiview RPLs are used for reference picture management operations such as insert 1020 and remove 1030, as well as prediction 1060 of the current frame.

It is noted that prediction 1060 for the multiview system is different than prediction 960 for the single-view system because prediction from different types of multiview reference pictures 1005 is enabled. Further details on the multiview reference picture management 1010 are described below.

Multiview Reference Picture List Manager

Before encoding a current frame in the encoder or before decoding the current frame in the decoder, a set of multiview reference pictures 1005 can be indicated in the multiview RPL 1050. As defined conventionally and herein, a set can have zero (null set), one or multiple elements. Identical copies of the RPLs are maintained by both the encoder and decoder for each current frame.

All frames inserted in the multiview RPLs 1050 are initialized and marked as usable for prediction using an appropriate syntax. According to the H.264/AVC standard and reference software, the 'used_for_reference' flag is set to '1'. In general, reference pictures are initialized so that a frame can be used for prediction in a video encoding system. To maintain compatibility with conventional single-view video compression standards, such as H.264/AVC, each reference picture is assigned a picture order count (POC). Typically, for single-view encoding and decoding systems, the POC corresponds to the temporal ordering of a picture, e.g., the frame number. For multiview encoding and decoding systems, temporal order alone is not sufficient to assign a POC for each reference picture. Therefore, we determine a unique POC for every multiview reference picture according to a convention. One convention is to assign a POC for temporal reference pictures based on temporal order, and then to reserve a sequence of very high POC numbers, e.g., 10,000-10,100, for the spatial and synthesized reference pictures. Other POC assignment conventions, or simply "ordering" conventions, are described in further detail below.

All frames used as multiview reference pictures are maintained in the RPL and stored in the DPB in such a way that the frames are treated as conventional reference pictures by the encoder 700 or the decoder 740. This way, the encoding and decoding processes can be conventional. Further details on storing multiview reference pictures are described below. For each current frame to be predicted, the RPL and DPB are updated accordingly.

Defining and Signaling Multiview Conventions

The process of maintaining the RPL is coordinated between the encoder 700 and the decoder 740. In particular, the encoder and decoder maintain identical copies of multiview reference picture list when predicting a particular current frame.

A number of conventions for maintaining the multiframe reference picture list are possible. Therefore, the particular convention that is used is inserted in the bitstream 731, or provided as sequence level side information, e.g., configuration information that is communicated to the decoder. Furthermore, the convention allows different prediction structures, e.g., 1-D arrays, 2-D arrays, arcs, crosses, and sequences synthesized using view interpolation or warping techniques.

For example, a synthesized frame is generated by warping a corresponding frame of one of the multiview videos acquired by the cameras. Alternatively, a conventional model of the scene can be used during the synthesis. In other embodiments of our invention, we define several multiview reference picture maintenance conventions that are dependent on view type, insertion order, and camera properties.

The view type indicates whether the reference picture is a frame from a video other than the video of the current frame, or whether the reference picture is synthesized from other frames, or whether the reference picture depends on other reference pictures. For example, synthesized reference pictures can be maintained differently than reference pictures from the same video as the current frame, or reference pictures from spatially adjacent videos.

The insertion order indicates how reference pictures are ordered in the RPL. For instance, a reference picture in the same video as the current frame can be given a lower order value than a reference picture in a video taken from an adjacent view. In this case, the reference picture is placed earlier in the multiview RPL.

Camera properties indicate properties of the camera that is used to acquire the reference picture, or the virtual camera that is used to generate a synthetic reference picture. These properties include translation and rotation relative to a fixed coordinate system, i.e., the camera 'pose', intrinsic parameters describing how a 3-D point is projected into a 2-D image, lens distortions, color calibration information, illumination levels, etc. For instance, based on the camera properties, the proximity of certain cameras to adjacent cameras can be determined automatically, and only videos acquired by adjacent cameras are considered as part of a particular RPL.

Figure 11:
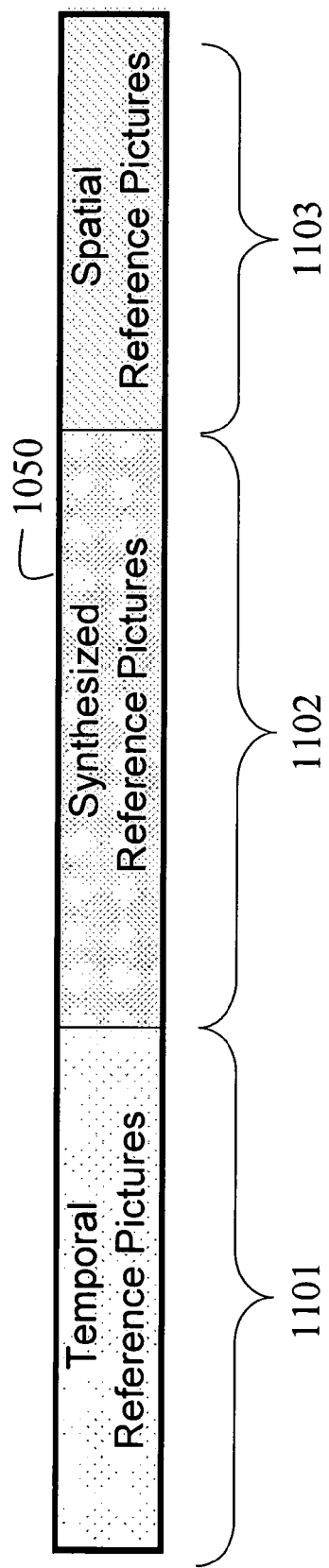
FIG. 11 is a block diagram of multiview reference pictures in a decoded picture buffer according to an embodiment of the invention.

As shown in FIG. 11, one embodiment of our invention uses a convention that reserves a portion 1101 of each reference picture list for temporal reference pictures 1003, reserves another portion 1102 for synthesized reference pictures 1002 and a third portion 1103 for spatial reference pictures 1001. This is an example of a convention that is dependent only on the view type. The number of frames contained in each portion can vary based on a prediction dependency of the current frame being encoded or decoded.

The particular maintenance convention can be specified by standard, explicit or implicit rules, or in the encoded bitstream as side information.

Storing Pictures in the DPB

The multiview RPL manager 1010 maintains the RPL so that the order in which the multiview reference pictures are stored in the DPB corresponds to their 'usefulness' to improve the efficiency of the encoding and decoding. Specifically, reference pictures in the beginning of the RPL can be predicatively encoded with fewer bits than reference pictures at the end of the RPL.

Figure 12:
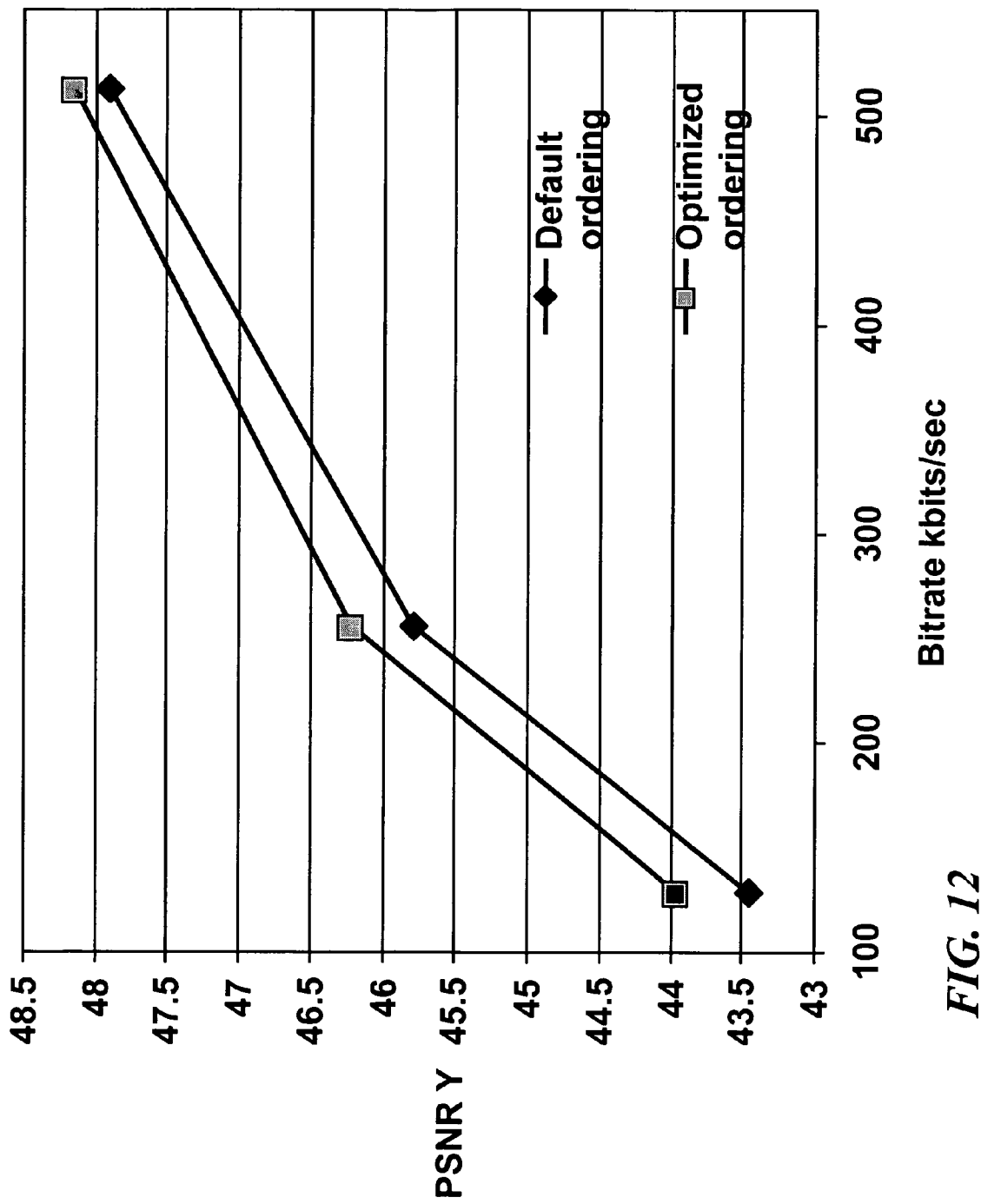
FIG. 12 is a graph comparing coding efficiencies of different multiview reference picture orderings.

As shown in FIG. 12, optimizing the order in which multiview references pictures are maintained in the RPL can have a significant impact on coding efficiency. For example, following the POC assignment described above for initialization, multiview reference pictures can be assigned a very large POC value because they do not occur in the normal temporal ordering of a video sequence. Therefore, the default ordering process of most video codecs can place such multiview reference pictures earlier in the reference picture lists.

Because temporal reference pictures from the same sequence generally exhibit stronger correlations than spatial reference pictures from other sequences, the default ordering is undesirable. Therefore, the multiview reference pictures are either explicitly reordered by the encoder, whereby the encoder then signals this reordering to the decoder, or the encoder and decoder implicitly reorder multiview reference pictures according to a predetermined convention.

Figure 13:
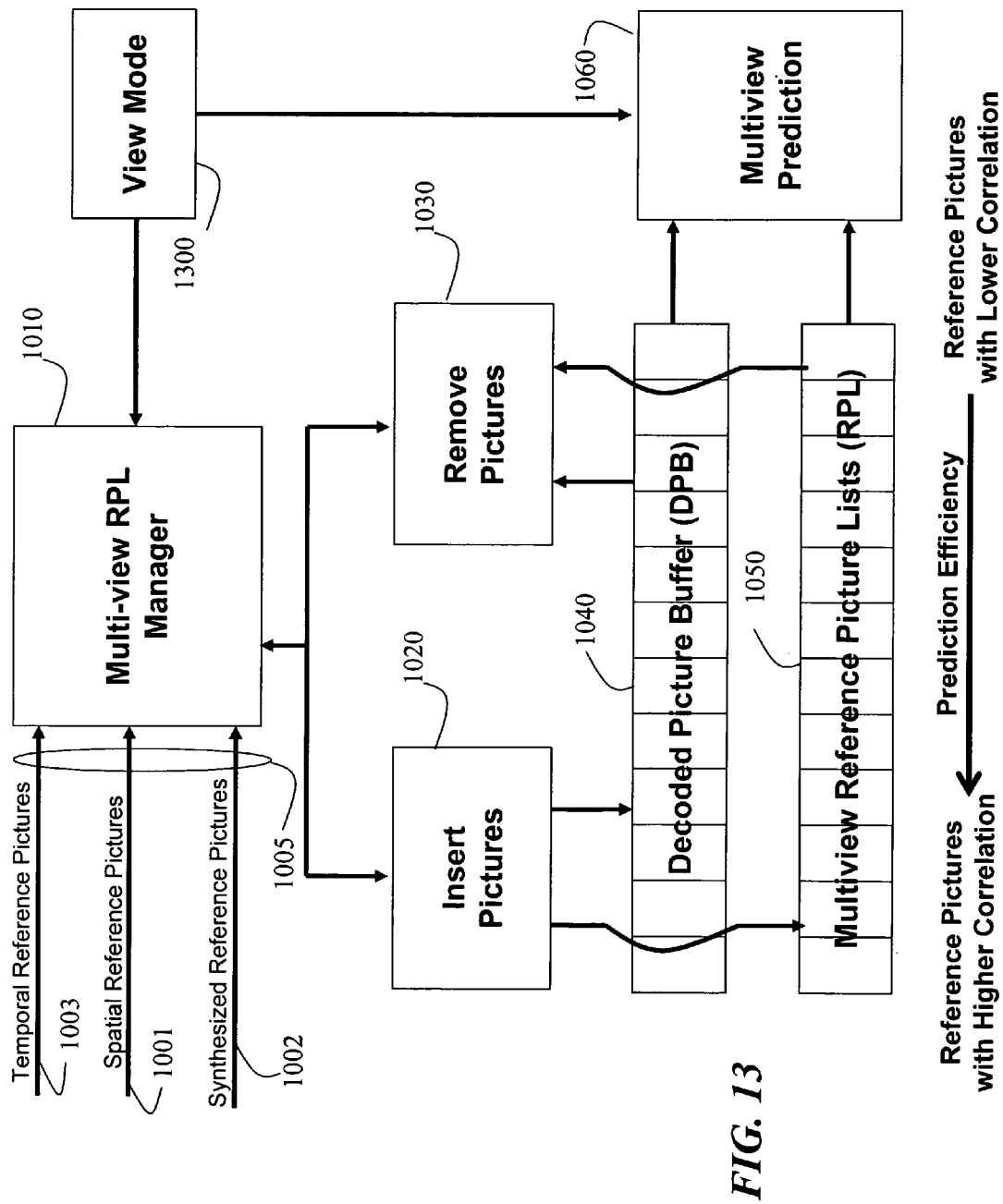
FIG. 13 is a block diagram of dependencies of view mode on the multiview reference picture list manager according to an embodiment of the invention.

As shown in FIG. 13, the order of the reference pictures is facilitated by a view mode 1300 to each reference picture. It is noted that the view mode 1300 also affects the multiview prediction process 1060. In one embodiment of our invention, we use three different types of view modes, I-view, P-view and B-view, which are described in further detail below.

Figure 14:
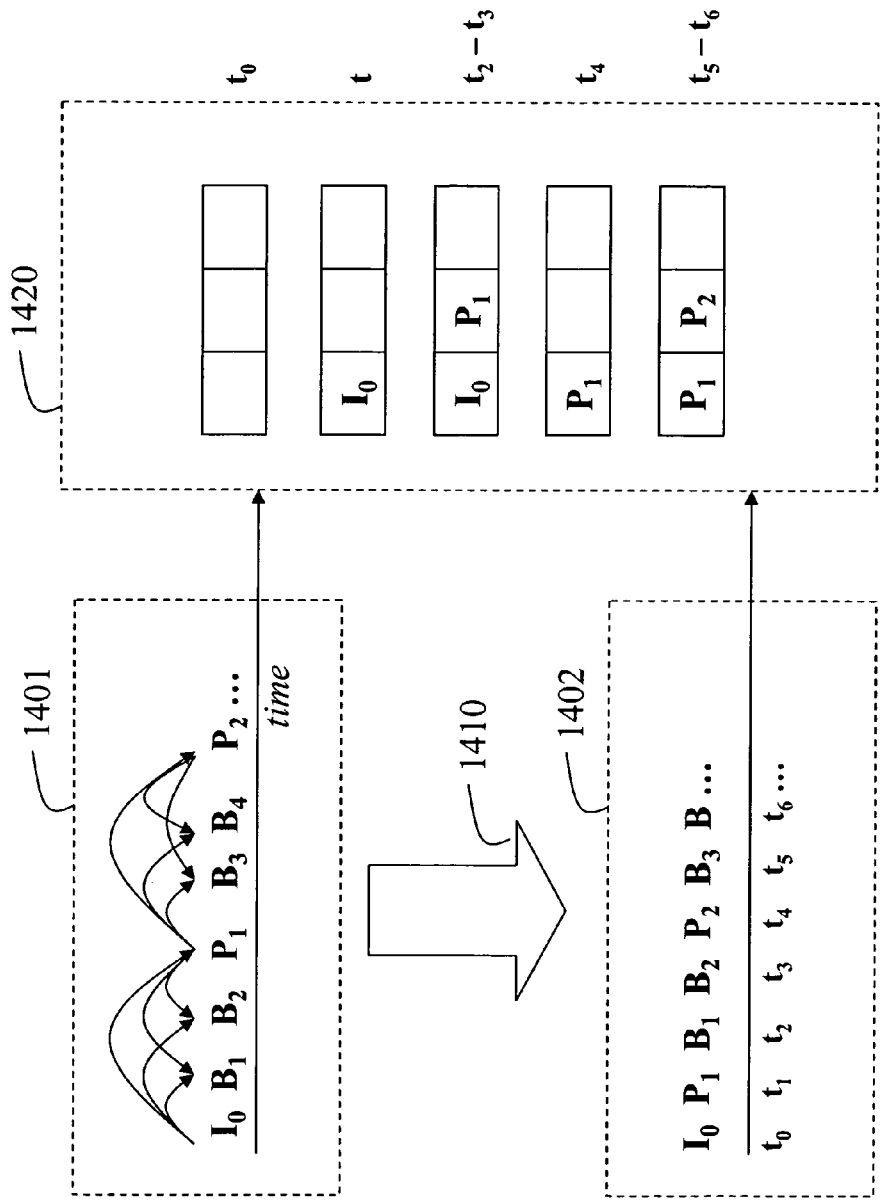
FIG. 14 is diagram of a prior art reference picture management for single view coding systems that employ prediction from temporal reference pictures.

Before describing the detailed operation of multiview reference picture management, prior art reference picture management for single video encoding and decoding systems is shown in FIG. 14. Only temporal reference pictures 901 are used for the temporal prediction 960. The temporal prediction dependency between temporal reference pictures of the video in acquisition or display order 1401 is shown. The reference pictures are reordered 1410 into an encoding order 1402, in which each reference picture is encoded or decoded at a time instants $t_0$-$t_6$. Block 1420 shows the ordering of the reference pictures for each instant in time. At time $t_0$, when an intra-frame $I_0$ is encoded or decoded, there are no temporal reference pictures used for temporal prediction, hence the DBP/RPL is empty. At time $t_1$, when the uni-directional inter-frame $P_1$ is encoded or decoded, frame $I_0$ is available as a temporal reference picture. At times $t_2$ and $t_3$, both frames $I_0$ and $P_1$ are available as reference frames for bi-directional temporal prediction of inter-frames $B_1$ and $B_2$. The temporal reference pictures and DBP/RPL are managed in a similar way for future pictures.

Figure 15:
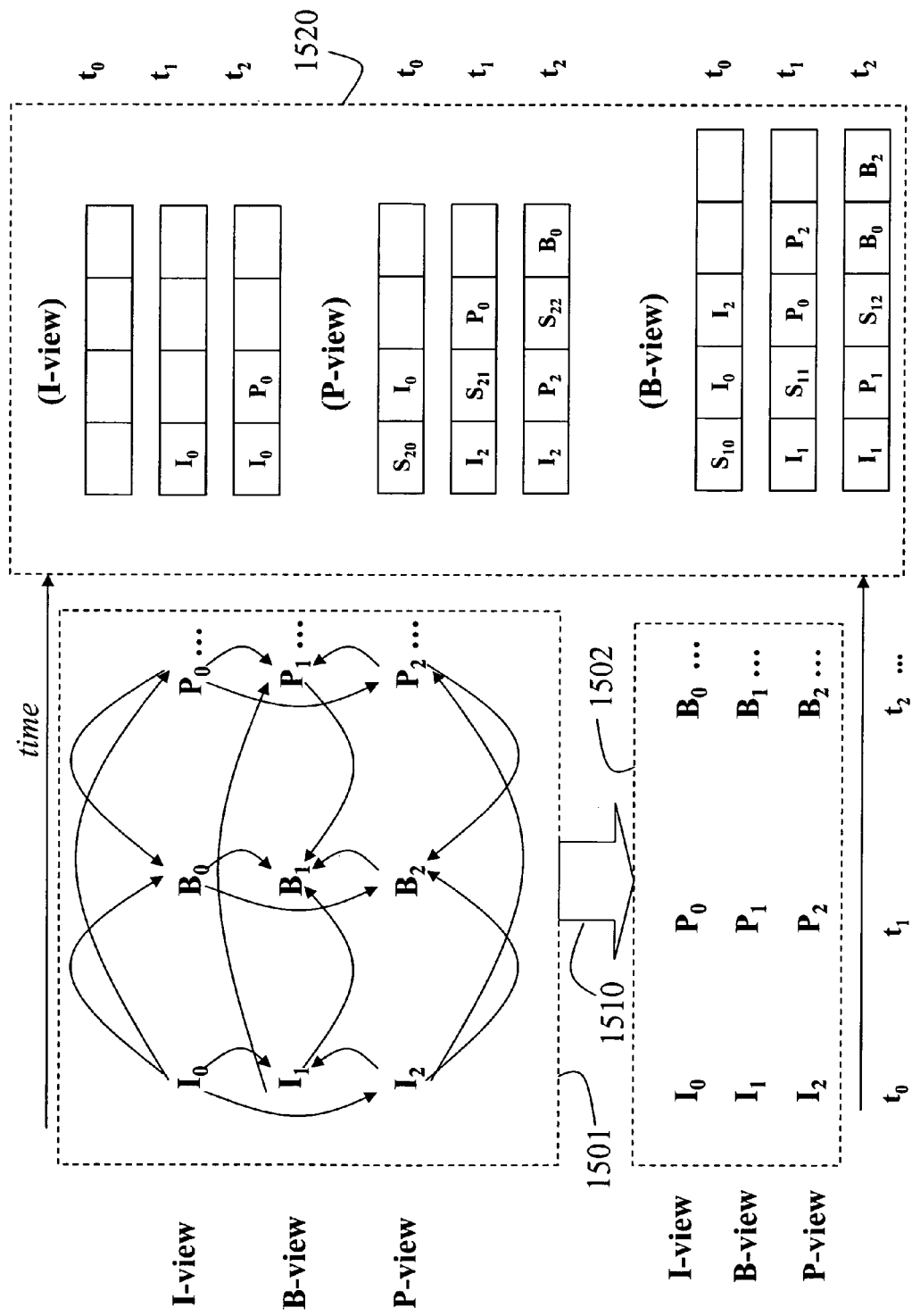
FIG. 15 is a diagram of a reference picture management for multiview coding and decoding systems that employ prediction from multiview reference pictures according to an embodiment of the invention.

To describe the multiview case according to an embodiment of the invention, we consider the three different types of views described above and shown in FIG. 15: I-view, P-view, and B-view. The multiview prediction dependency between reference pictures of the videos in display order 1501 is shown. As shown in FIG. 15, the reference pictures of the videos are reordered 1510 into a coding order 1502 for each view mode, in which each reference picture is encoded or decoded at a given time instant denoted $t_0$-$t_2$. The order of the multiview reference pictures is shown in block 1520 for each time instant.

The I-view is the simplest mode that enables more complex modes. I-view uses conventional encoding and prediction modes, without any spatial or synthesized prediction. For example, I-views can be encoded using conventional H.264/AVC techniques without any multiview extensions. When spatial reference pictures from an I-view sequence are placed into the reference lists of other views, these spatial reference pictures are usually placed after temporal reference pictures.

As shown in FIG. 15, for the I-view, when frame $I_0$ is encoded or decoded at $t_0$, there are no multiview reference pictures used for prediction. Hence, the DBP/RPL is empty. At time $t_1$, when frame $P_0$ is encoded or decoded, $I_0$ is available as a temporal reference picture. At time $t_2$, when the frame $B_0$ is encoded or decoded, both frames $I_0$ and $P_0$ are available as temporal reference pictures.

P-view is more complex than I-view in that P-view allows prediction from another view to exploit the spatial correlation between views. Specifically, sequences encoded using the P-view mode use multiview reference pictures from other I-view or P-view. Synthesized reference pictures can also be used in the P-view. When multiview reference pictures from an I-view are placed into the reference lists of other views, P-views are placed after both temporal reference pictures and after multiview references pictures derived from I-views.

As shown in FIG. 15, for the P-view, when frame $I_2$ is encoded or decoded at $t_0$, a synthesized reference picture $S_{20}$ and the spatial reference picture $I_0$ are available for prediction. Further details on the generation of synthesized pictures are described below. At time $t_1$, when $P_2$ is encoded or decoded, $I_2$ is available as a temporal reference picture, along with a synthesized reference picture $S_{21}$ and a spatial reference picture $P_0$ from the I-view. At time $t_2$, there exist two temporal reference pictures $I_2$ and $P_2$, as well as a synthesized reference picture $S_{22}$ and a spatial reference picture $B_0$, from which predictions can be made.

B-views are similar to P-views in that the B-views use multiview reference pictures. One key difference between P-views and B-views is that P-views use reference pictures from its own view as well as one other view, while B-views may reference pictures in multiple views. When synthesized reference pictures are used, the B-views are placed before spatial reference pictures because synthesized views generally have a stronger correlation than spatial references.

As shown in FIG. 15, for the B-view, when $I_1$ is encoded or decoded at $t_0$, a synthesized reference picture $S_{10}$ and the spatial reference pictures $I_0$ and $I_2$ are available for prediction. At time $t_1$, when $P_1$ is encoded or decoded, $I_1$ is available as a temporal reference picture, along with a synthesized reference picture $S_{11}$ and spatial reference pictures $P_0$ and $P_2$ from the I-view and P-view, respectively. At time $t_2$, there exist two temporal reference pictures $I_1$ and $P_1$, as well as a synthesized reference picture $S_{12}$ and spatial reference pictures $B_0$ and $B_2$, from which predictions can be made.

It must be emphasized that the example shown in FIG. 15 is only for one embodiment of the invention. Many different types of prediction dependencies are supported. For instance, the spatial reference pictures are not limited to pictures in different views at the same time instant. Spatial reference pictures can also include reference pictures for different views at different time instants. Also, the number of bi-directionally predicted pictures between intra-pictures and uni-directionally predicted inter-pictures can vary. Similarly, the configuration of I-views, P-views, and B-views can also vary. Furthermore, there can be several synthesized reference pictures available, each generated using a different set of pictures or different depth map or process.

Compatibility

One important benefit of the multiview picture management according to the embodiments of the invention is that it is compatible with existing single-view video coding systems and designs. Not only does this provide minimal changes to the existing single-view video coding standards, but it also enables software and hardware from existing single view video coding systems to be used for multiview video coding as described herein.

The reason for this is that most conventional video encoding systems communicate encoding parameters to a decoder in a compressed bitstream. Therefore, the syntax for communicating such parameters is specified by the existing video coding standards, such as the H.264/AVC standard. For example, the video coding standard specifies a prediction mode for a given macroblock in a current frame from other temporally related reference pictures. The standard also specifies methods used to encode and decode a resulting prediction error. Other parameters specify a type or size of a transform, a quantization method, and an entropy coding method.

Therefore, our multiview reference pictures can be implemented with only limited number of modifications to standard encoding and decoding components such as the reference picture lists, decoded picture buffer, and prediction structure of existing systems. It is noted that the macroblock structure, transforms, quantization and entropy encoding remain unchanged.

View Synthesis

As described above for FIG. 8, view synthesis is a process by which frames 801 corresponding to a synthetic view 802 of a virtual camera 800 are generated from frames 803 acquired of existing videos. In other words, view synthesis provides a means to synthesize the frames corresponding to a selected novel view of the scene by a virtual camera not present at the time the input videos were acquired. Given the pixel values of frames of one or more actual video and the depth values of points in the scene, the pixels in the frames of the synthesized video view can be generated by extrapolation and/or interpolation.

Prediction from Synthesized Views

Figure 16:
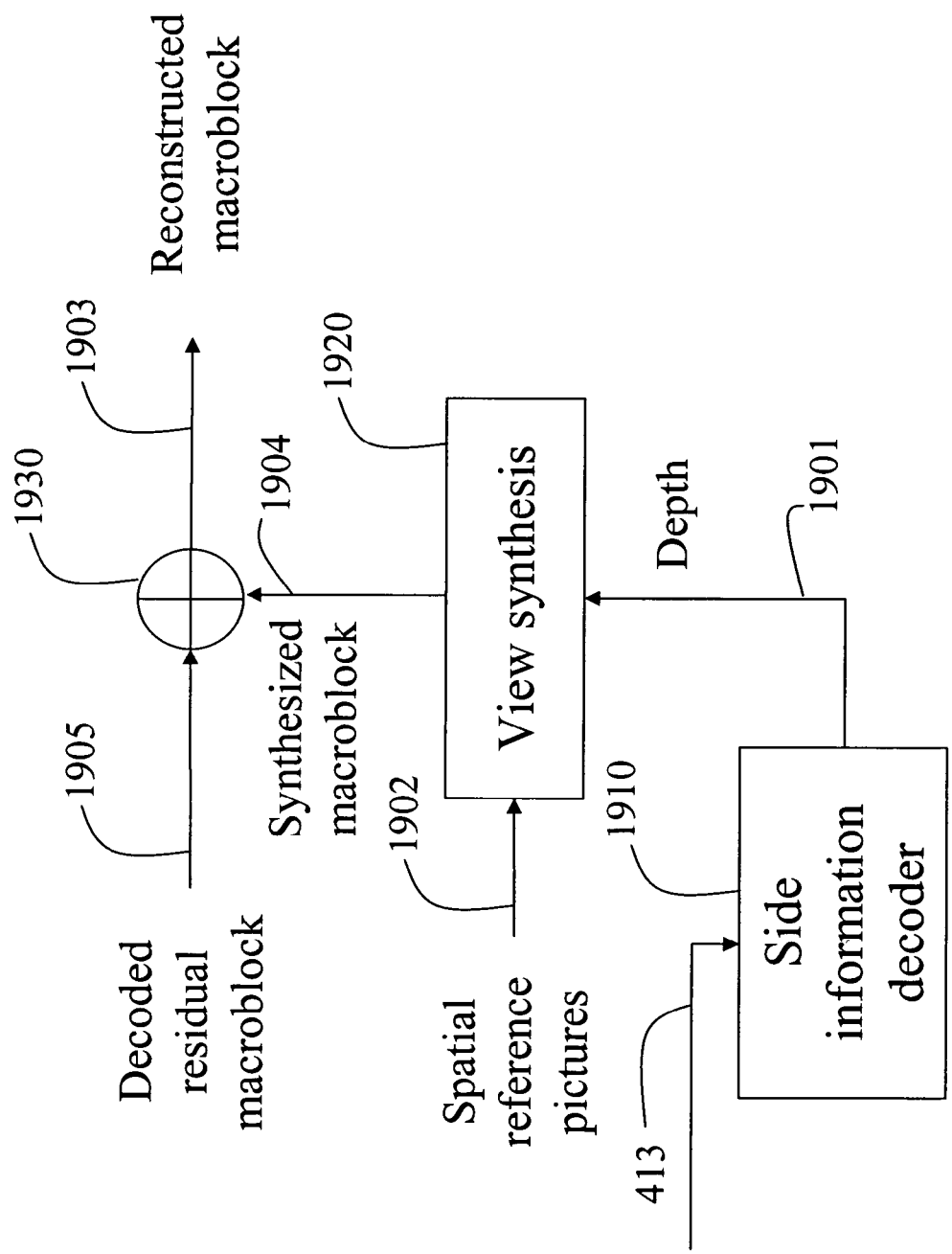
FIG. 16 is a block diagram of view synthesis in a decoder using depth information encoded and received as side information according to an embodiment of the invention.

FIG. 16 shows a process for generating a reconstructed macroblock using the view-synthesis mode, when depth 1901 information is included in the encoded multiview bitstream 731. The depth for a given macroblock is decoded by a side information decoder 1910. The depth 1901 and the spatial reference pictures 1902 are used to perform view synthesis 1920, where a synthesized macroblock 1904 is generated. A reconstructed macroblock 1903 is then formed by adding 1930 the synthesized macroblock 1904 and a decoded residual macroblock 1905.

Details on Multiview Mode Selection at Encoder

Figure 17:
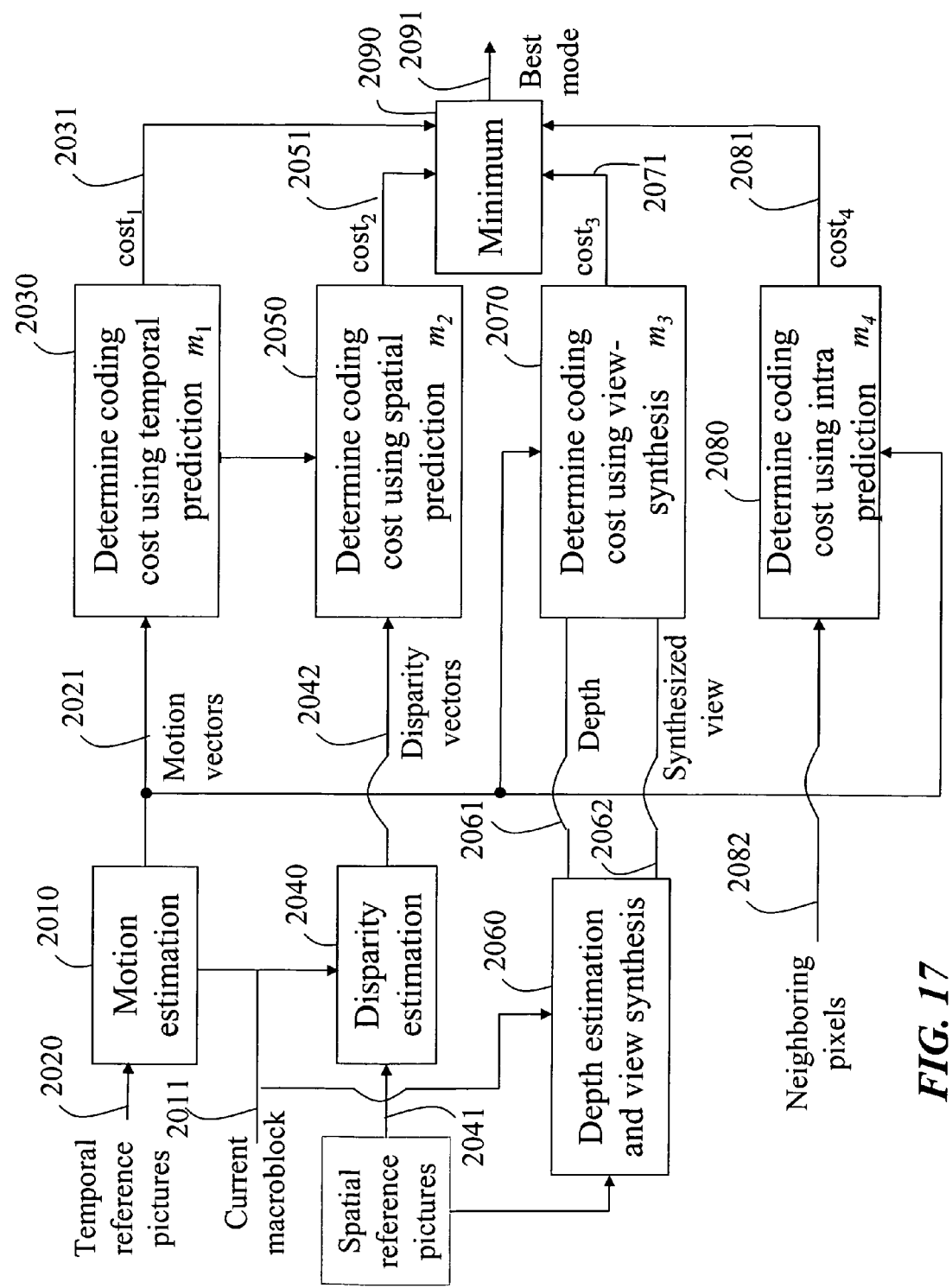
FIG. 17 is a block diagram of cost calculations for selecting a prediction mode according to an embodiment of the invention.

FIG. 17 shows a process for selecting the prediction mode while encoding or decoding a current frame. Motion estimation 2010 for a current macroblock 2011 is performed using temporal reference pictures 2020. The resultant motion vectors 2021 are used to determine 2030 a first coding cost, $cost_1$ 2031, using temporal prediction. The prediction mode associated with this process is $m_1$.

Disparity estimation 2040 for the current macroblock is performed using spatial reference pictures 2041. The resultant disparity vectors 2042 are used to determine 2050 a second coding cost, $cost_2$ 2051, using spatial prediction. The prediction mode associated with this process is denoted $m_2$.

Depth estimation 2060 for the current macroblock is performed based on the spatial reference pictures 2041. View synthesis is performed based on the estimated depth. The depth information 2061 and the synthesized view 2062 are used to determine 2070 a third coding cost, $cost_3$ 2071, using view-synthesis prediction. The prediction mode associated this process is $m_3$.

Adjacent pixels 2082 of the current macroblock are used to determine 2080 a fourth coding cost, $cost_4$ 2081, using intra prediction. The prediction mode associated with process is $m_4$.

The minimum cost among $cost_1$, $cost_2$, $cost_3$ and $cost_4$ is determined 2090, and one of the modes $m_1$, $m_2$, $m_3$ and $m_4$ that has the minimum cost is selected as the best prediction mode 2091 for the current macroblock 2011.

View Synthesis Using Depth Estimation

Using the view synthesis mode 2091, the depth information and displacement vectors for synthesized views can be estimated from decoded frames of one or more multiview videos. The depth information can be per-pixel depth estimated from stereo cameras, or it can be per-macroblock depth estimated from macroblock matching, depending on the process applied.

An advantage of this approach is a reduced bandwidth because depth values and displacement vectors are not needed in the bitstream, as long as the encoder has access to the same depth and displacement information as the decoder. The encoder can achieve this as long as the decoder uses exactly the same depth and displacement estimation process as the encoder. Therefore, in this embodiment of the invention, a difference between the current macroblock and the synthesized macroblock is encoded by the encoder.

The side information for this mode is encoded by the side information encoder 720. The side information includes a signal indicating the view synthesis mode and the reference view(s). The side information can also include depth and displacement correction information, which is the difference between the depth and displacement used by the encoder for view synthesis and the values estimated by the decoder.

Figure 18:
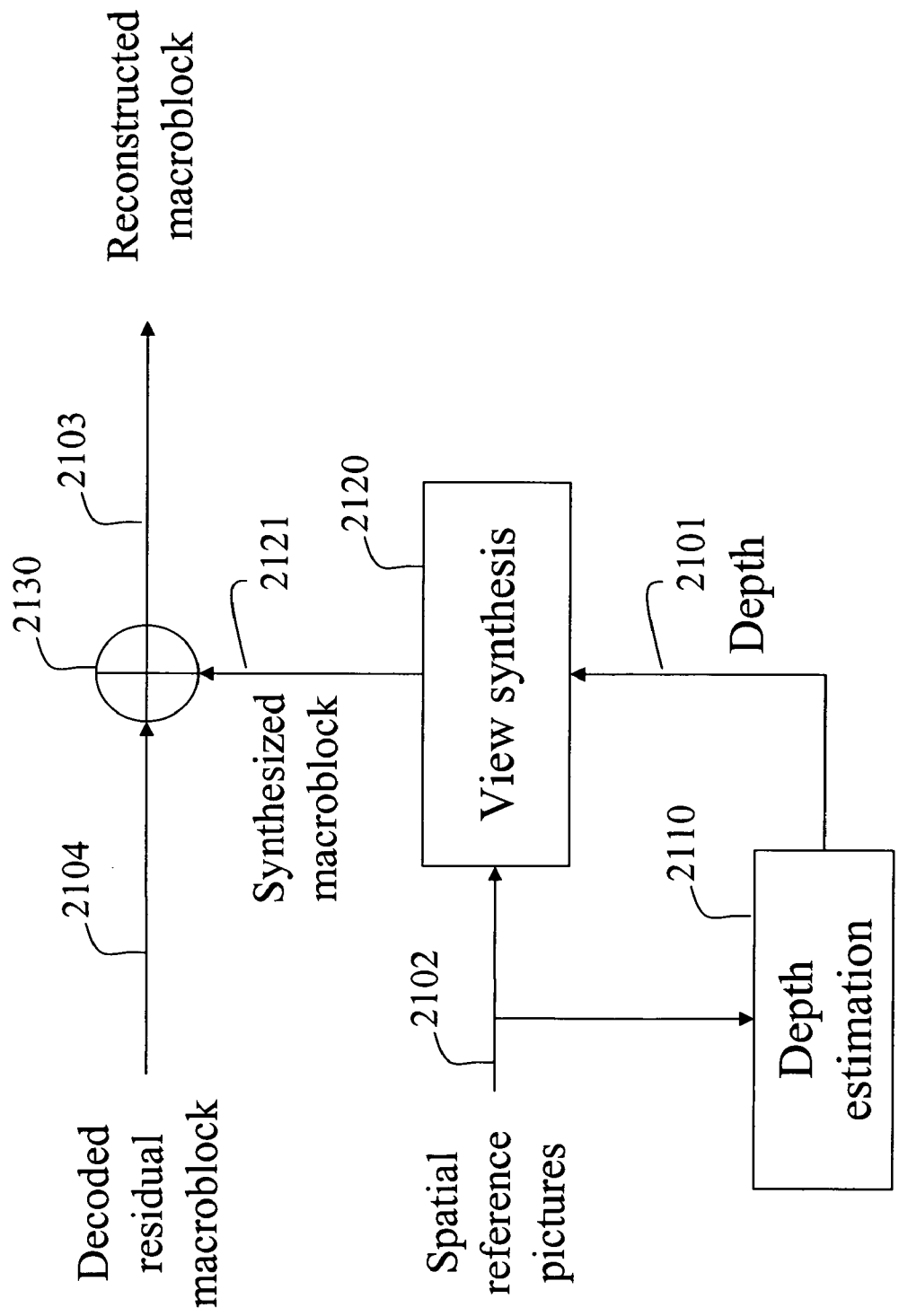
FIG. 18 is a block diagram of view synthesis in a decoder using depth information estimated by a decoder according to an embodiment of the invention.

FIG. 18 shows the decoding process for a macroblock using the view-synthesis mode when the depth information is estimated or inferred in the decoder and is not conveyed in the encoded multiview bitstream. The depth 2101 is estimated 2110 from the spatial reference pictures 2102. The estimated depth and the spatial reference pictures are then used to perform view synthesis 2120, where a synthesized macroblock 2121 is generated. A reconstructed macroblock 2103 is formed by the addition 2130 of the synthesized macroblock and the decoded residual macroblock 2104.

Spatial Random Access

In order to provide random access to frames in a conventional video, intra-frames, also known as I-frames, are usually spaced throughout the video. This enables the decoder to access any frame in the decoded sequence, although at a decreased compression efficiency.

Figure 19:
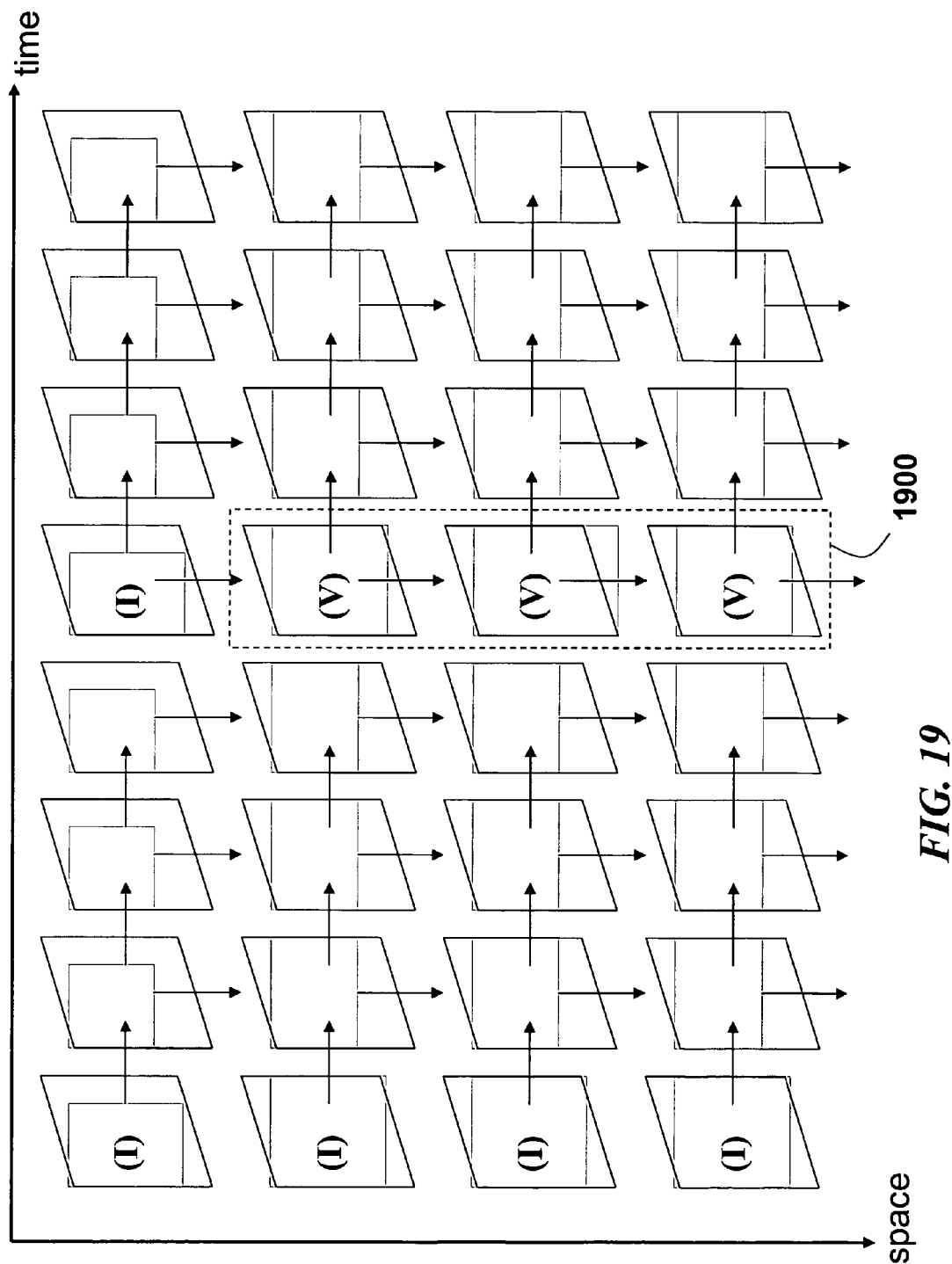
FIG. 19 is a block diagram of multiview videos using V-frames to achieve spatial random access in the decoder according to an embodiment of the invention.

For our multiview encoding and decoding system, we provide a new type of frame, which we call a 'V-frame' to enable random access and increase compression efficiency. A V-frame is similar to an I-frame in the sense that the V-frame is encoded without any temporal prediction. However, the V-frame also allows prediction from other cameras or prediction from synthesized videos. Specifically, V-frames are frames in the compressed bitstream that are predicted from spatial reference pictures or synthesized reference pictures. By periodically inserting V-frames, instead of I-frames, in the bitstream, we provide temporal random access as is possible with I-frames, but with a better encoding efficiency. Therefore, V-frames do not use temporal reference frames. FIG. 19 shows the use of I-frames for the initial view and the use of V-frames for subsequent views at the same time instant 1900. It is noted that for the checkerboard configuration shown in FIG. 5, V-frames would not occur at the same time instant for all views. Any of the low-band frames could be assigned a V-frame. In this case, the V-frames would be predicted from low-band frames of neighboring views.

In H.264/AVC video coding standard, IDR frames, which are similar to MPEG-2 I-frames with closed GOP, imply that all reference pictures are removed from the decoder picture buffer. In this way, the frame before an IDR frame cannot be used to predict frames after the IDR frame.

In the multiview decoder as described herein, V-frames similarly imply that all temporal reference pictures can be removed from the decoder picture buffer. However, spatial reference pictures can remain in the decoder picture buffer. In this way, a frame in a given view before the V-frame cannot be used to perform temporal prediction for a frame in the same view after the V-frame.

To gain access to a particular frame in one of the multiview videos, the V-frame for that view must first be decoded. As described above, this can be achieved through prediction from spatial reference pictures or synthesized reference pictures, without the use of temporal reference pictures.

After the V-frame of the select view is decoded, subsequent frames in that view are decoded. Because these subsequent frames are likely to have a prediction dependency on reference pictures from neighboring views, the reference pictures in these neighboring views are also be decoded.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for randomly accessing multiview videos, comprising the steps of:
   maintaining a reference picture list for a picture associated with a particular time instant and a particular one of the multiview videos, wherein the reference picture list indexes temporal reference pictures and spatial reference pictures of the multiview videos, where the temporal reference pictures are associated with a time instant that is different than the particular time instant and the spatial reference pictures are associated with the same particular time instant, and wherein each reference picture is assigned an unique picture order count;
   predicting a picture at the particular time instant for the particular one of the multiview videos using only spatial reference pictures at the particular time instant; and
   removing all temporal references pictures associated with the particular one of the multiview videos from the reference picture list processing the picture.

2. The method of claim 1, further comprising:
   receiving a bitstream corresponding to a plurality of encoded multiview videos.

3. The method of claim 1, in which the picture enables random access to the multiview videos in a decoder.

4. The method of claim 3, in which the random access to a particular frame in a select one of the multiview videos is provided by decoding the picture preceding the particular frame in the selected one of the multiview videos, then decoding subsequent frames in the select one of the multiview videos.

5. The method of claim 4, in which reference pictures from neighboring multiview videos are decoded for prediction of the subsequent frames in the particular one of the multiview videos.

6. The method of claim 1, in which picture are generated by an encoder according to a MPEG-4 standard.

7. The method of claim 1, in which the placement of the picture in the multiview videos are determined by an encoder.

8. The method of claim 1, wherein the reference picture list indexes synthesized reference pictures and the picture is predicted from the synthesized reference pictures.

9. The method of claim 1, in which the picture are predicted from low band frames.

10. A system for randomly accessing multiview videos, comprising the steps of:
    means for maintaining a reference picture list for a picture associated with a particular time instant and a particular one of the multiview videos,
    wherein the reference picture list indexes temporal reference pictures and spatial reference pictures of the multiview videos, where the temporal reference pictures are associated with a time instant that is different than the particular time instant and the spatial reference pictures are associated with the same particular time instant, and wherein each reference picture is assigned a unique picture order count;
    means for predicting the picture at the particular time instant for the particular one of the multiview videos using only spatial reference pictures at the particular time instant; and
    means for removing all temporal references pictures associated with the particular one of the multiview videos from the reference picture list after processing the picture.

* * * * *